US012656467B1

(12) United States Patent (10) Patent No.: US 12,656,467 B1
Pattabhiraman et al. (45) Date of Patent: Jun. 16, 2026

(54) CLEANING MECHANISM FOR A SENSOR ASSEMBLY

(71) Applicant: Zoox, Inc., Foster City, CA (US)

(72) Inventors: Arvind Pattabhiraman, Alameda, CA (US); Rajith Jayaratne, Castro Valley, CA (US)

(73) Assignee: Zoox, Inc., Foster City, CA (US)

( * ) Notice: Subject to any disclaimer, the term of this patent is extended or adjusted under 35 U.S.C. 154(b) by 901 days.

(21) Appl. No.: 17/896,990

(22) Filed: Aug. 26, 2022

(51) Int. Cl.
      *G01S 7/497* (2006.01)
      *G01S 7/481* (2006.01)
      *G01S 17/931* (2020.01)

(52) U.S. Cl.
      CPC ............ *G01S 7/497* (2013.01); *G01S 7/4813* (2013.01); *G01S 17/931* (2020.01); *G01S 2007/4977* (2013.01)

(58) Field of Classification Search
      None
      See application file for complete search history.

(56) References Cited

U.S. PATENT DOCUMENTS

| 10,259,431 | B1 * | 4/2019 | Ybarra | B60S 1/566 |
| 10,589,726 | B1 * | 3/2020 | Ingram | B60S 1/566 |
| 12,071,107 | B2 * | 8/2024 | Shawgo | B08B 5/02 |
| 12,196,864 | B1 * | 1/2025 | Lacaze | G01K 3/005 |
| 2020/0023815 | A1 * | 1/2020 | Galera | B60S 1/522 |
| 2020/0142187 | A1 * | 5/2020 | Hu | H04N 23/61 |

* cited by examiner

*Primary Examiner* — Hovhannes Baghdasaryan
(74) *Attorney, Agent, or Firm* — Lee & Hayes, P.C.

(57) ABSTRACT

A vehicle includes a sensor assembly and a cleaning mechanism for cleaning the sensor assembly. The sensor assembly has a sensor window and a sensor residing within or behind the sensor window. The sensor has a field of view (FoV) for sensing an environment of the vehicle. The FoV includes a first portion directed towards the vehicle and a second portion directed away from the vehicle for sensing an environment of the vehicle. The cleaning mechanism has a rail coupled to the sensor assembly at a location inside the first portion of the FoV, a carriage operably coupled to the rail, an actuator coupled to the carriage, and a circular-shaped wiper coupled to the carriage. The circular-shaped wiper encircles the sensor window.

19 Claims, 20 Drawing Sheets

CLEANING MECHANISM FOR A SENSOR ASSEMBLY

BACKGROUND

A vehicle can use sensors to capture sensor data to detect objects in an environment. Accurate determinations of object characteristics can assist, for example, an autonomous vehicle to traverse the environment. However, the quality of the data collected by sensors may become degraded in certain circumstances, including based on environmental factors such as precipitation, contaminants, or other obstructions on one or more sensors of the vehicle. In such cases, the data collected by the sensors may be suboptimal or even unsuitable for use, potentially impacting vehicle navigation, obstacle detection and avoidance, and other functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 illustrates a fourth side view of the cleaning mechanism for cleaning the sensor assembly of the vehicle of FIG. 1, according to examples of the present disclosure.

DETAILED DESCRIPTION

Figure 1:
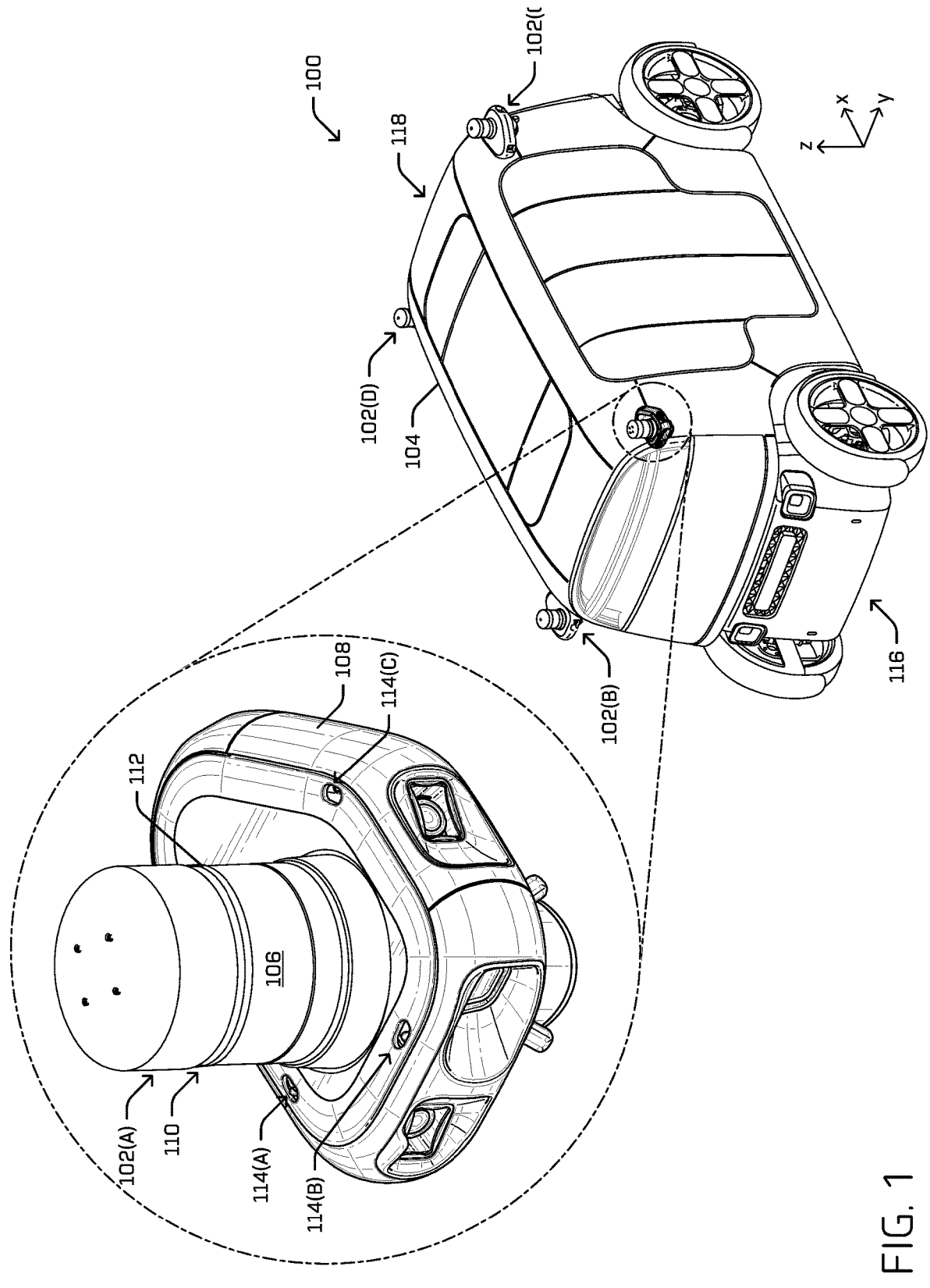
FIG. 1 illustrates a perspective view of example vehicle, showing an example cleaning mechanism for cleaning an example sensor assembly of the vehicle, according to examples of the present disclosure.

This application relates to a cleaning mechanism for a sensor assembly, such as a sensor assembly of a vehicle. The cleaning mechanism may include a wiper that translates over a sensor window (e.g., lens) of the sensor assembly. Sensor(s) can reside within and/or beneath the sensor window for capturing sensor data of an environment of the vehicle. In some instances, the wiper couples to a carriage that is engaged with a rail. Actuator(s) may couple to the carriage, and as the actuator(s) actuate, the carriage may translate within or on the rail to move the wiper over the sensor window. By implementing the cleaning mechanism, precipitation (e.g., rain, snow, sleet, etc.), contaminants (e.g., mud, dirt, bird droppings, etc.), or other obstruction(s) on the sensor window may be reduced to improve an accuracy and/or completeness of sensor data captured by the sensor(s).

In some instances, the vehicle may include any number of sensor assemblies, each having any number of respective cleaning mechanisms. For example, the vehicle may include four sensor assemblies disposed at four corners of the vehicle. In some instances, the sensor assemblies may be mounted on, or proximate to, a roof of the vehicle. However, the sensor assemblies may be mounted at additional and/or alternate locations on the vehicle (e.g., on a roof, on a leading or trailing end of the vehicle, along sides, etc.). In some instances, the cleaning mechanisms of the sensor assemblies may be independently controlled, or the cleaning mechanisms may operate in unison across the sensor assemblies. The sensor assemblies may include suitable attachment mechanisms, such as frames, brackets, and so forth, for coupling to a body or chassis of the vehicle.

In some instances, the sensor(s) of the sensor assembly represent LIDAR sensor(s). Any number of LIDAR sensor(s) may be included within the sensor assembly. In some examples, the LIDAR sensors may include rotating LIDAR sensors that rotate about an axis of rotation to scan a 360-degree view around the LIDAR sensors. In some examples, the LIDAR sensors may include multiple channels (emitter and detector pairs) oriented to cover a range of elevations (ε) at, above, and/or below a ray normal to the axis of rotation. Thus, in the case of a rotating LIDAR sensor having multiple channels oriented to cover the range of elevations, the LIDAR sensor has a field of view (FoV) that includes a generally doughnut shaped region around the sensor which includes both vertical and horizontal components.

In some instances, although the LIDAR sensor(s) may have a 360 degree FoV, only a portion of sensor data generated by the LIDAR sensor(s) may be used. For example, the FoV may include a first portion that is used for processing (e.g., plan a route for the vehicle), while a second portion may be discarded and not used. The portion of the FoV that is discarded is referred to herein as a blind spot of the LIDAR sensor(s). In some instances, the rail of the cleaning mechanism may couple to the sensor assembly at a location within the second portion. Placing the rail within the blind spot of the LIDAR sensor(s) prevents the rail, as well as the carriage engaged with the rail, from obstructing the usable portion of the FoV of the LIDAR sensor(s). In some instances, the LIDAR sensors may have a 270 degree usable portion of the FoV and a 90 degree blind spot. Here, the rail and the carriage may be disposed within the 90 degree blind spot to avoid any obstruction of the LIDAR sensors. In some instances, the usable portion of the FoV is oriented outward from the vehicle, while the blind spot is oriented towards the vehicle. Although a certain FoV, usable portion of the FoV, and discarded portion of the FoV are discussed, the LIDAR sensors may include a different FoV, as well as different usable and discarded portions of the FoV. For example, in some instances, the usable portion of the FoV may be 360 degrees.

In some instances, the sensor window includes a substantially cylindrical shape. In some instances, the wiper of the cleaning mechanism is substantially circular shaped to clean the circular shaped sensor window. In some instances, the wiper may engage with and clean an entirety of the sensor window (e.g., 360 degrees of the sensor window), and/or may engage with and clean less than an entirety of the sensor window (e.g., 270 degrees). For example, the wiper may only clean portions of the sensor window corresponding to the usable portion of the FoV of the LIDAR sensor(s). In this instance, cleaning less than an entire circumference of the sensor window may result in less friction created between the wiper and the sensor window.

In some instances, the wiper includes a wiper blade overmolded onto a ring, and a bracket for coupling the wiper to the carriage. For example, the wiper blade may be formed via over molding a piece of rubber, silicone, or other suitable materials around the ring. The ring may be substantially rigid to provide structural support to the wiper blade as the wiper blade translates over the sensor window. For example, as the wiper blade translates over the sensor window, friction between the wiper blade and the sensor window may cause the wiper blade to sag, chatter, or judder. However, the ring provides structural support and rigidity to the wiper blade to prevent such occurrences. In some instances, the wiper blade may be made of polyisoprene, butadiene, ethylene-propylene-diene rubber, neoprene, or any combination thereof, while the ring may be made of a metal, plastics, composites (e.g., carbon fiber, fiber glass), etc. The wiper may couple to the carriage via the bracket using fasteners, snap-fits, pressure fits, and so forth, or the carriage may be formed integrally with the bracket. Although discussed as being overmolded, the ring may couple to the wiper blade in other manners (e.g., adhesive, clamp, snap fit, etc.) for providing structural support to the wiper blade. For example, the ring may encircle the wiper blade, around a top, bottom, and/or exterior, as compared to being overmolded by the wiper blade.

The rail may couple to the sensor assembly, such that as the carriage translates within the rail, the wiper blade cleans the sensor window. In some instances, the rail includes channels, slots, guides, tracks, or other receiving features in which wheels, tabs, flanges, or other complimentary features of the carriage are received. For example, the carriage may include wheels that are sized to engage with tracks of the rail. The engagement between the wheels and the tracks may secure the carriage and the rail together and align the carriage within/on the rail.

Actuator(s) can couple to the carriage for imparting motion to the wiper. For example, the actuator(s) may represent linear actuator(s) that couple to an end of the carriage. An opposite end of the actuator(s) not coupled to the carriage may couple to a frame or housing of the sensor assembly, or other portions of the vehicle. However, in other examples, the actuator(s) may represent screw drives, rack and pinion assemblies, motors, or any other actuator configured to cause translation of the wiper over the sensor window. In such instances, the actuator(s) may engage with the carriage to translate the carriage along the rail. For example, in the event that the actuator includes a screw drive, the carriage may include a receptacle for receiving the screw drive such that actuation of the screw drive translates the carriage along the rail. In some instances, the actuator(s) are disposed within the rail (e.g., a channel in which a portion of the carriage translates) or may be disposed external to the rail. The carriage may translate by any amount within the rail, for example, depending upon a dimension (e.g., height) of the sensor window.

Though described herein as including the rail and carriage mechanism, other mechanisms to translate the wiper blade over the sensor window are envisioned. For example, in some instances, an actuator may couple directly to the wiper blade and be configured to translate the wiper blade over the sensor window without the rail and carriage. In this instance, in a retracted state of the actuator, the actuator and/or wiper blade may not occlude any portions of the FoV of the LIDAR sensor(s) and the usable portion of the FoV of the LIDAR sensor(s) may be 360 degrees. During cleaning, the actuator may extend, translating the wiper blade over the sensor window, and occlude a portion of the usable FoV. However, when not in use, portions of the cleaning mechanism do not occlude the LIDAR sensor(s) FoV.

In some instances, the wiper moves between a first position and a second position on the sensor window. The first position may be a top-most position on the sensor widow, while the second position may be a bottom-most position on the sensor window. During cleaning of the sensor window, or during a wiper cycle, the wiper may move from the first position, to the second position, and then back to the first position. In some instances, the first position may be considered a resting position of the wiper when not cleaning the sensor window. In some examples, in the first position, the wiper may not obstruct the usable portion of FoV of the LIDAR sensor(s). For example, the first position may be outside the FoV of the LIDAR sensor(s) or within another blind spot of the LIDAR sensor(s) so as to not obstruct the FoV. Although the wiper is described as moving from the first position, to the second position, and then back to the first position, the wiper may move between the first position and the second position to clean the sensor window. In such instances, in the second position, the wiper may not obstruct the FoV of the LIDAR sensor(s).

In some instances, individual sensor assemblies include multiple cleaning mechanisms. For example, the sensor assemblies may include first LIDAR sensor(s) arranged beneath/within a first sensor window, and second LIDAR sensor(s) arranged beneath within a second sensor window. In such instances, a first cleaning mechanism (or first wiper) may clean the first sensor window, and a second cleaning mechanism (or second wiper) may clean the second sensor window. As such, the sensor assemblies may include multiple cleaning mechanisms.

In some instances, the cleaning mechanism further includes sprayers (e.g., nozzles) that spray cleaning fluid onto the sensor window to assist in cleaning the sensor window. In some instances, the sprayers are integrated within the sensor assembly and oriented to spray fluid on the sensor window. In other instances, the sprayers may be integrated within the wiper and spray fluid onto the sensor window before and/or while the wiper blade translates over the sensor window. For example, conduit(s) may be disposed on or about the wiper blade and/or the carriage for routing the fluid onto the sensor window. The conduit(s) may include sufficient slack (e.g., coil) to extend during translation of the wiper blade. In some instances, the sprayers may be arranged around the wiper blade, so as to encircle the sensor window and spray fluid onto the sensor window at multiple locations. The sensor assembly may, in some instances, also include heater(s) to prevent the buildup of sleet, snow, freezing rain, and the like. For example, heater(s) may be disposed on an interior portion of the sensor window to heat the sensor window, in or on the wiper, and/or in or on a housing of the sensor assembly proximate the sensor window.

In some instances, the cleaning mechanism may include more than one wiper blade. For example, two wiper blades may be vertically spaced apart from one another. In some instances, a nozzle may be disposed between the two (or more) wiper blades such that the fluid is contained within the two wiper blades. In such instances, the fluid may be collected for recycling or discarding. Still, the wiper blades may be different from one another. For example, the cleaning mechanism may include a wiper blade and a sponge, brush, and the like to remove contaminants. This sponge or brush may or may not be actuated at each instance of actuation of the wiper blade.

Though discussed in relation to LIDAR sensor(s), in some instances, the sensor assembly may include additional or alternative sensor(s) and the sensor window may be disposed over such additional or alternative sensor(s). For example, the additional or alternative sensor(s) may include a radar sensor, a camera, LWIR cameras, solid state LIDAR, an inertial sensor, an environmental sensor, an audio sensor, and/or a time-of-flight sensor, just to name a few. In such instances, the sensor(s) may have a FoV different than those described herein, and/or a usable portion of the FoV than those described herein. Additionally, although the sensor window is described as being circular, the sensor window may include other shapes (e.g., hexagonal, ovular, etc.). In such instances, the wiper may be correspondingly shaped to engage with and clean the sensor window.

In some instances, additional sensor(s), such as pressure sensor(s) or force sensor(s) may be used to measure an integrity of the wiper. For example, during normal operation, the actuator(s) may exert a certain amount of force to move the wiper over the sensor window. However, as the wiper becomes worn, the actuator(s) may exert less force to move the wiper. Conversely, if debris obstructs the wiper, the actuator(s) may exert more force to move the wiper. In some instances, this amount of force may be used to schedule repairs, replacements, maintenance, and the like. Additionally, the wiper may include a tensioner (e.g., circular spring, hose clamp, etc.) that increases or decreases an amount of force applied by the wiper to the sensor window.

In some examples, the cleaning mechanism may be programmed to clean the sensor assembly based on predetermined schedules (e.g., every ten seconds, every minute, every hour, every day, etc.), weather of the environment in which the vehicle resides, a speed of the vehicle, and/or detecting blemishes in sensor data. For example, blemishes may be detected within sensor data (e.g., within the usable portion of the FoV) generated by the LIDAR sensors, and as a result, the cleaning mechanism may be controlled to clean the sensor assembly. Examples of detecting blemishes within sensor data are disclosed in, for example, U.S. patent application Ser. No. 17/139,938, filed Dec. 31, 2020, and entitled "Imaging Device Blemish Detection Structures and Techniques," the entirety of which is herein incorporated by reference for all its purposes.

Although discussed herein as finding use with a vehicle, the cleaning mechanism may find use in other environments. For example, the cleaning mechanism may clean sensor(s) disposed within a sensor assembly arranged in a manufacturing line, on a building or other structure, etc. In such instances, the sensor(s) may include LIDAR sensor(s), camera(s), and/or other types of sensors.

The cleaning mechanism described herein can improve functioning of the LIDAR sensor(s) by removing precipitation (e.g., rain, snow, sleet, etc.), contaminants (e.g., mud, dirt, bird droppings, etc.), or other obstruction(s) on the sensor from the sensor window of the LIDAR sensor(s). In examples in which the LIDAR sensor(s) are associated with an autonomous vehicle, data generated from the LIDAR sensor(s) may enable subsequent processes by a vehicle computing device that receives the data to be performed more accurately, require less processing power, and/or require less memory (e.g., classification, tracking, prediction, route planning, trajectory generation, and the like are improved due to fewer obstructions on the LIDAR sensor(s)).

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 illustrates an example vehicle 100 having one or more sensor assemblies configured with multiple sensors to collect information about the surroundings of the vehicle 100, in accordance with examples of the disclosure.

In the illustrated example, the vehicle 100 includes a first sensor assembly 102(A), a second sensor assembly 102(B), a third sensor assembly 102(C), and a fourth sensor assembly 102(D) (collectively "sensor assemblies 102" or singularly "sensor assembly 102") coupled to a body 104 of the vehicle 100. Each of the sensor assemblies 102 may include sensors configured to generate sensor data representative of an environment of the vehicle 100. For example, in some instances, the sensors may include LIDAR sensors, imaging sensors, such as cameras, and so forth. As shown, each of the sensor assemblies 102 may be disposed at an elevation above a surface on which the vehicle 100 travels in order for the sensor(s) of the sensor assemblies 102 to observe obstacles that the vehicle 100 may encounter.

The LIDAR sensor(s) may be arranged beneath (e.g., within, behind, etc.) a sensor window 106 of the sensor assemblies 102. The sensor window 106 is shown extending from a shell 108 (e.g., base) of the sensor assembly 102 that couples to the body 104 of the vehicle 100. The LIDAR sensor(s) disposed within the sensor assembly 102 generate beams that are transmitted into the environment. The returned light is then processed and analyzed by computing systems of the vehicle 100 for traversing (e.g., plan a route for the vehicle 100) about the environment, for example. However, from time to time, obstructions, such as precipitation (e.g., snow, sleet, hail, etc.), contaminants (e.g., dust, dirt, mud, bird droppings, etc.), and so forth, may accumulate on the sensor window 106 and affect an operation of the LIDAR sensor(s). For example, the obstructions may cause occlusions within the data, redirection or refraction of the beam, and/or backscattering. To alleviate these concerns, the vehicle 100 includes a cleaning mechanism 110 that cleans the sensor assemblies 102 or portions thereof, such as the sensor window 106. The cleaning mechanism 110, as discussed herein in detail, includes a wiper 112 having a wiper blade that translates along (e.g., over) the sensor window 106 (e.g., in the Z-direction) to clean or remove obstruction(s) on the sensor window 106, thereby reducing or eliminating the effects of such obstruction(s). In some instances, and as shown, the sensor window 106 may be substantially circular in shape, and correspondingly, the wiper 112 of the cleaning mechanism 110 may be substantially circular in shape. As such, the wiper 112 is configured to translate over the sensor window 106 to rid the sensor window 106 of obstructions.

In some instances, the LIDAR sensor(s) disposed within the sensor assemblies 102 may have a FoV that is substantially 360 degrees (e.g., about the Y-axis). However, although the LIDAR sensor(s) have a 360 degree FoV, only a portion of the sensor data generated by the LIDAR sensor(s) may be used (or usable) by the vehicle 100. For example, a portion of the sensor data generated by the LIDAR sensor(s) may be discarded, and not used by the vehicle 100 (e.g., planning a route for the vehicle 100). In such instances, the discarded or unusable portion of the FoV of the LIDAR sensor(s) may be considered a blind spot. In some instances, the usable portion of the FoV is 270 degrees, while the unused portion is 90 degrees. As will be explained herein, the cleaning mechanism 110 may couple to the sensor assembly 102 within the blind spots, so as to not obstruct the usable portion of FoV of the LIDAR sensors. For example, the cleaning mechanism 110 may couple to a portion of the sensor assembly 102 (or the vehicle 100) at a location within the blind spot in order to not block the usable portion of FoV of the LIDAR sensors. In some instances, any number of LIDAR sensor(s) may be disposed within the sensor assembly 102, and the FoV of the LIDAR sensor(s) may be combined to form an effective FoV. However, although described has having a 360 degree FoV, the LIDAR sensor(s) may have a FoV that is less than 360 degrees. Moreover, the usable portion of the FoV may be less than or greater than 270 degrees, and/or the unused portion of the FoV may be less than or greater than 90 degrees.

In some instances, the cleaning mechanism 110 may further include sprayers 114, such as a first sprayer 114(A), a second sprayer 114(B), and/or a third sprayer 114(C) (collectively "sprayers 114" or singularly "sprayer 114") coupled to or disposed within the shell 108. The sprayers 114 may direct fluid (e.g., windshield washing fluid) onto the sensor window 106. Although shown at a particular position on the sensor assembly 102, the sprayers 114 may be located differently than shown and/or a different number of sprayers 114 may be included. For example, in some instances, the sprayers 114 may be disposed on the wiper 112.

Although a particular shape of the sensor window 106 and the wiper 112 is shown, other shapes are envisioned. For example, the sensor window 106 may be hexagonal, ovular, and so forth, and in such instances, the wiper 112 may be correspondingly shaped to clean the sensor window 106. The wiper 112 may engage with or encircle an entirety of the sensor window 106 (e.g., 360 degrees), or may engage with or encircle less than an entirety of the sensor window (e.g., 270 degrees).

As discussed, in examples, the vehicle 100 may have multiple sensor assemblies disposed on the body 104 of the vehicle 100. For example, the body 104 of the vehicle 100 may have a first end 116 including the first sensor assembly 102(A) and the second sensor assembly 102(B), a second end 118 opposite the first end 116 that includes the third sensor assembly 102(C) and the fourth sensor assembly 102(D). In examples, the sensor assemblies 102 each have an effective sensor FoV and when mounted to the vehicle 100, the FoVs may overlap with one another. In some instances, the overlapping FoV allow the sensor assemblies 102 to see around the entire vehicle 100.

The sensor assembly 102 may couple to the vehicle 100, or the body 104, via a mounting system. The mounting system may include a mounting arm that couples to the sensor assembly 102. Additional details of the sensor assemblies 102 are described in, for example, U.S. patent application Ser. No. 16/864,082, filed Apr. 30, 2020, entitled "Sensor Pod Assembly," which is incorporated herein by reference in its entirety and for all purposes.

The cleaning mechanism 110 may increase an accuracy of LIDAR data captured by the LIDAR sensor(s) of the sensor assembly 102. In some instances, the LIDAR data from the LIDAR sensor(s) (e.g., the LIDAR data representing the usable portion of the FoV) may be sent to a vehicle computing device associated with the vehicle 100. As a result, the vehicle 100 may perform various actions based at least in part on the LIDAR data (e.g., the LIDAR data). For example, a planning component of the vehicle 100 may use the LIDAR data to determine a trajectory for the vehicle 100 in the environment. The trajectory (e.g., direction, speed, acceleration, etc.) enables the vehicle 100 to avoid static and/or dynamic objects such as a pedestrian and/or another vehicle, just to name a few. However, it is to be understood that the LIDAR data may be used for other purposes. By implementing the techniques described herein, safety of the vehicle 100 may be improved by performing an action that mitigates potential obstruction of the LIDAR sensor(s) for "seeing" an environment (e.g., detection of objects can be improved to enable the vehicle 100 to navigate more safely).

Figure 2:
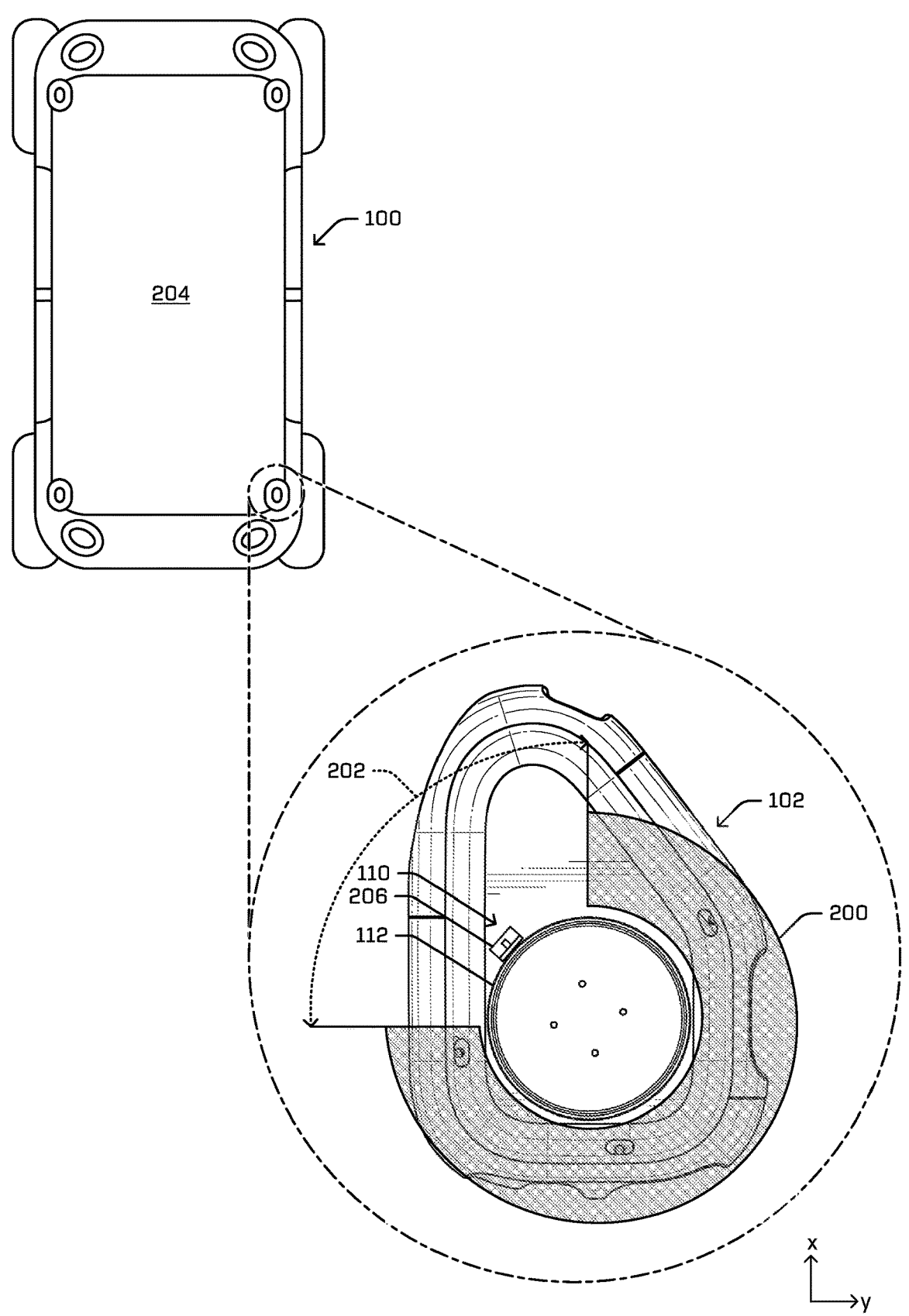
FIG. 2 illustrates a top view of the vehicle of FIG. 1, showing the cleaning mechanism for cleaning the sensor assembly of the vehicle, according to examples of the present disclosure.

FIG. 2 illustrates a top view of the vehicle 100 and the sensor assembly 102. The sensor(s) within the sensor assembly 102 have a usable portion of a FoV 200 that is substantially outward and away from the vehicle 100 in order to sense objects and the like in front of, behind, or to the side of the vehicle 100. In some instances, the usable portion of the FoV 200 may be substantially 270 degrees. Additionally, an unused portion of the FoV 202 is oriented toward a roof 204 of the vehicle 100, for example, which may correspond to a blind spot of the sensor(s). As introduced above, while the sensor(s) may have a 360 degree FoV, a first portion of the FoV may be used for processing (e.g., the usable portion of the FoV 200), while a second portion of the FoV (e.g., the unused portion of the FoV 202) may not be used. As such, while the sensor(s) may generated data representing a 360 degree FoV, only data of the environment within the usable portion of the FoV 200 may be used. The unused portion of the FoV 202 may be discarded. In some instances, unused portion of the FoV 202 may be substantially 90 degrees.

In addition to the cleaning mechanism 110 including the wiper 112, the cleaning mechanism 110 may include a rail 206. The rail 206 may represent a track, slide, and the like within which a carriage (not shown) traverses. The carriage operably couples to the rail 206 and translates on, within, or about the rail 206. In doing so, given the coupling of the wiper 112 to the carriage, the wiper 112 cleans the sensor window 106 during translation of the carriage along the rail 206.

As shown, the rail 206 may couple to the sensor assembly 102 (or the vehicle 100), at a location within the unused portion of the FoV 202. This positioning avoids the rail 206 occluding portions of the usable portion of the FoV 200. In other words, because the usable portion of the FoV 200 is less than 360 degrees, the rail 206 (as well as other portions of the cleaning mechanism 110) are able to reside within this space so as to not occlude the sensor(s).

Although the usable portion of the FoV 200 and the unused portion of the FoV 202 are shown having certain areas, degrees, and so forth, the usable portion of the usable portion of the FoV 200 and/or the unused portion of the FoV 202 may be smaller than shown, bigger than shown, and/or differently spaced than shown. For example, the usable portion of the FoV 200 may be less than 270 degrees or greater than 270 degrees (e.g., 360 degrees). Here, in some instances, the cleaning mechanism 110, or portions thereof, such as the rail 206, may or may not occlude portions of the usable portion of the FoV 200. Likewise, the unused portion of the FoV 202 may be less than or greater than 90 degrees. In some instances, an entirety of the FoV of the sensor(s) may be usable, such that there are no unused portions of the FoV of the sensor(s). Additionally, in some instances, the sensor assemblies 102 have multiple sensors with each individual sensor having a sensor FoV. In some instances, the individual FoV of the individual sensors may be combined to create an effective sensor FoV of the sensor assembly 102.

As shown, the usable portion of the FoV 200 and the unused portion of the FoV 202 may correspond a horizontal component of the FoV of the sensor(s). The sensor(s) may also include a vertical component of the FoV (as discussed in FIG. 3). The horizontal and vertical components may represent the FoV of the sensor(s) (e.g., the usable portion of the FoV 200 and the unused portion of the FoV 202).

In some instances, each of the sensor(s) of the sensor assemblies 102 may have the same or usable portion of the FoV 200 and/or unused portion of the FoV 202. For example, each of the sensor assemblies 102 may have a 270 degree usable portion of the FoV 200 that is oriented outward from the vehicle 100, and the unused portion of the FoV 202 may be oriented towards the vehicle 100 (e.g., towards the roof 204 of the vehicle 100). As such, the respective cleaning mechanism 110 of the sensor assemblies 102 may be positioned within the blind spot of the sensor assemblies 102.

Additional details of a FoV of the sensor assembly 102 are disclosed in, for example, U.S. patent application Ser. No. 16/864,109, filed Apr. 30, 2020, and entitled "Sensor Pod Coverage and Placement on Vehicle," the entirety of which is herein incorporated by reference and for all purposes.

Figure 3:
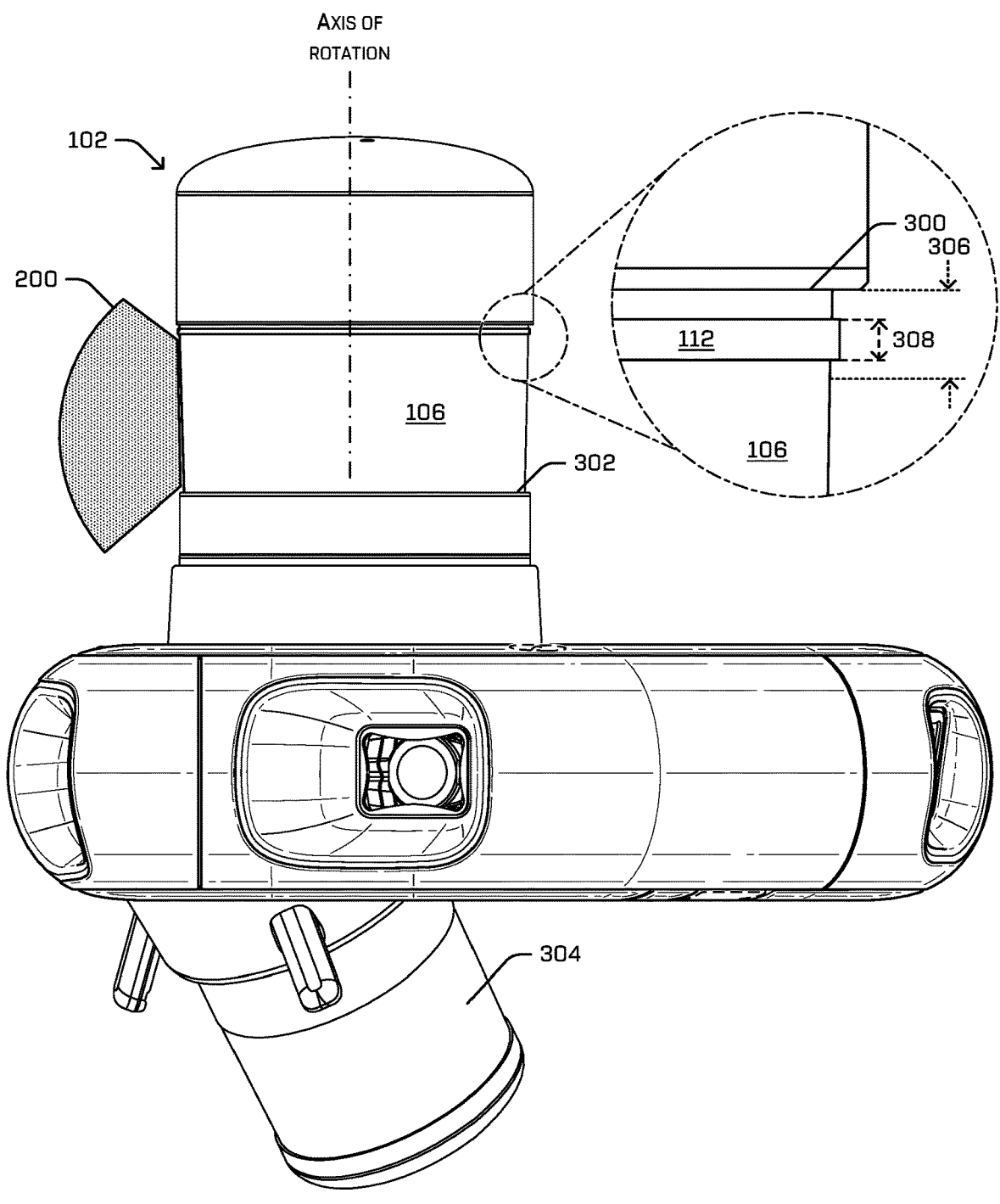
FIG. 3 illustrates a first side view of the cleaning mechanism for cleaning the sensor assembly of the vehicle of FIG. 1, according to examples of the present disclosure.

FIG. 3 illustrates a side view of the sensor assembly 102, showing the wiper 112 of the cleaning mechanism 110 in a retracted or resting state. In the resting state, the wiper 112 may not be actuated to clean the sensor window 106. The wiper 112 is shown residing over the sensor window 106, proximate to a top 300 of the sensor window 106. When actuated, the wiper 112 may translate in a direction towards a bottom 302 of the sensor window 106. However, in the resting state, in some instances, the wiper 112 may reside proximate the bottom 302 of the sensor window 106.

As introduced above, the sensor(s) of the sensor assembly 102 have the usable portion of the FoV 200. FIG. 2 illustrates that the usable portion of the FoV 200 includes a vertical component. That is, the usable portion of the FoV 200 may be in both horizontal and vertical directions. In some instances, the vertical component of the usable portion of the FoV 200 may be substantially 110 degrees. In the resting state of the wiper 112, the wiper 112 is outside of the usable portion of the FoV 200, or in some instances, the wiper 112 may be outside the FoV of the sensor(s). For example, in the resting state, the wiper 112 may reside or be disposed within a zone 306 (e.g., region, portion, etc.) of the sensor window 106 that is outside of the FoV. More particularly, the zone 306 may include a top that corresponds to the top 300 of the sensor window 106, while a bottom of the zone 306 may be spaced apart at a distance from the top 300 of the sensor window 106 (in a direction towards the bottom 302). Within this zone 306, the sensor(s) are not configured to capture data of the environment (i.e., outside the FoV). The sensor(s) may have an axis of rotation, about which they rotate for capturing sensor data depicting the environment. That is, the sensor(s) may include rotating LIDAR sensors that rotate about the axis of rotation to scan a 360-degree view around the LIDAR sensors. In some examples, the LIDAR sensors may include multiple channels (emitter and detector pairs) oriented to cover a range of elevations ($\varepsilon$) at, above, and/or below a ray normal to the axis of rotation. Thus, in the case of a rotating LIDAR sensor having multiple channels oriented to cover the range of elevations, the LIDAR sensor has a field of view (FoV) that includes a generally doughnut shaped region around the sensor which includes both vertical and horizontal components. As such, while the LIDAR sensor(s) rotate about the axis of rotation for capturing sensor data of environment (e.g., 360 degrees), only a portion of the sensor data (i.e., the sensor data associated with the usable portion of the FoV 200) may be used by the vehicle 100.

In some instances, a height of the zone 306 (e.g., between the top 300 of the sensor window 106 and a distance spaced apart from the top 300 of the sensor window 106) may be between approximately four millimeters (mm) and ten mm. Correspondingly, a height 308 of the wiper 112 may be less than a height of the zone 306. The zone 306 may also be disposed around the sensor window 106 (e.g., about the Z-axis). As such, in the resting state, the wiper 112 does not occlude the FoV of the sensor(s).

The vertical component of the usable portion of the FoV 200 may be different than shown. However, the portion in which the wiper 112 resides, in the resting state, is external to the usable portion of the FoV 200 so as to not occlude the sensor(s) disposed beneath the sensor window 106. In some instances, the sensor window 106 may include a similar zone located at the bottom 302 of the sensor window 106. Here, the wiper 112 may have a resting state proximate to the bottom 302, and while in the resting state, the wiper 112 may not occlude the usable portion of the FoV 200 of the sensor(s).

In some instances, the wiper 112 may be disposed closer to the top 300 of the sensor window 106 in the resting state than shown. For example, an upper surface of the wiper 112 may abut a housing disposed adjacent to the top 300 of the sensor window 106. Additionally, as noted above, in some instances, the sensor assemblies 102 have multiple sensors with each individual sensor having a sensor FoV. In some instances, the individual FoV of the individual sensors may be combined to create an effective sensor FoV of the sensor assembly 102.

As also shown, the sensor assembly 102 may have an additional sensor window 304 that has additional sensor(s) (e.g., LIDAR sensor(s)) for imaging the environment. For example, the additional sensor(s) within the additional sensor window 310 may be angled downward, relative to the sensor window 106. In some instances, the FoV of the sensor(s) within the sensor window 106 may provide a view of objects further from the vehicle 100, whereas the FoV of the additional sensor(s) of the additional sensor window 304 may provide a view of objects closer to the vehicle 100. In some instances, the additional sensor window 304 may include a similar cleaning mechanism for cleaning the additional sensor window 304. Operation of the cleaning mechanism for the additional sensor window 304 may be similar to that as described herein for the sensor window 106. In some instances, individual sensor assemblies include multiple cleaning mechanisms. In such instances, a first cleaning mechanism (or first wiper) may clean the sensor window 106, and a second cleaning mechanism (or second wiper) may clean the additional sensor window 304. As such, the sensor assemblies may include multiple cleaning mechanisms.

In some instances, each of the sensor(s) of the sensor assemblies 102 may have the same or different vertical component of the usable portion of the FoV 200. For example, each of the sensor assemblies 102 may have the vertical component of the usable portion of the FoV 200 that is oriented outward from the vehicle 100. Additionally, each of the sensor assemblies 102 have a respective zone in which the wiper 112 resides in the resting state. As such, when not in use, the wiper 112 may not occlude the sensor(s).

Figure 4:
FIG. 4 illustrates a second side view of the cleaning mechanism for cleaning the sensor assembly of the vehicle of FIG. 1, according to examples of the present disclosure.

FIG. 4 illustrates a side view of the sensor assembly 102. The rail 206 of the cleaning mechanism 110 is shown coupled to the sensor assembly 102. For example, the sensor assembly 102 may include a first housing 400 disposed vertically above the sensor window 106, and a second housing 402 disposed vertically below the sensor window 106. The rail 206 may couple to the first housing 400 and/or the second housing 402 (e.g., fasteners) such that the rail 206 is disposed (e.g., spans) across the sensor window 106. However, as discussed above, the rail 206 is disposed across the sensor window 106 at a location that is within the unused portion of the FoV 202 (e.g., with the blind spot).

A carriage 404 is shown coupled to, or operatively engaged with, the rail 206. The carriage 404 receives, or otherwise couples to, the wiper 112 for translating the wiper 112 over the sensor window 106, between the top 300 and the bottom 302, vice versa. As will be explained herein, actuator(s) may couple to the carriage 404, and when actuated, translate the carriage 404 within the rail 206 along an actuation direction 406. In doing so, given the coupling between the carriage 404 and the wiper 112, the wiper 112 correspondingly moves with the carriage 404 to clean the sensor window 106. That is, the actuator(s) are configured to translate the carriage 404 such that the carriage 404 moves the wiper 112 between the top 300 and the bottom 302 of the sensor window 106. The actuation direction 406 may be parallel to a central axis of the sensor assembly 102 (or the sensor window 106) in the Z-direction.

The rail 206 and the carriage 404 include a width that is within the unused portion of the FoV 202. Moreover, as introduced above, the wiper 112 is disposed within the zone 306 while in the resting state. In such instance, the carriage 404 moves the wiper 112 into the zone 306 following a cleaning of the sensor window 106, or as part of cleaning the sensor window 106.

Although a particular embodiment of the rail 206 is shown, in some instances, alternative embodiments are included. For example, two rails may be used to translate the carriage 404. Moreover, the rail 206 may couple to the sensor assembly 102 at additional or alternative locations. As will also be explained herein, the actuator(s) that translate the carriage 404 may reside within a channel of the rail 206 that faces the sensor window 106. However, in some instances, the actuator(s) may be disposed external to the channel and visible exterior to the rail 206.

The sensor assembly 102 includes a mounting interface 408, which may receive a mounting arm of a mounting system that couples the sensor assembly 102 to the vehicle 100. The mounting interface 408 may resemble a socket into which the mounting arm is received. In such instances, the mounting arm may extend from the body 104 of the vehicle 100, for example, and into the mounting interface 408. Frames or other mounting brackets may couple to the mounting arm.

In some instances, the mounting interface 408 also includes a connection 410. The connection 410 may receive power, control signals, and/or cleaning fluids for the sensor assembly 102. For example, computing components of the vehicle 100 may supply control signals to the cleaning mechanism 110, as well as other components in or coupled to the sensor assembly 102 for controlling an operation thereof, such as when to actuate and clean the sensor window 106. Additionally, the cleaning mechanism 110 may receive fluid from the connection 410. Data captured by the sensor(s) of the sensor assembly 102 may be provided to the computing components of the vehicle 100 via the connection 410. The connection 410 may include suitable connectors, such as press-fit mechanisms, couplers, and so forth. Any number of connectors may form the connection 410 to receive power, data, and so forth (e.g., five, ten, etc.). Although shown as residing within the mounting interface 408, the connection 410 may reside external to the mounting interface 408.

Figure 5:
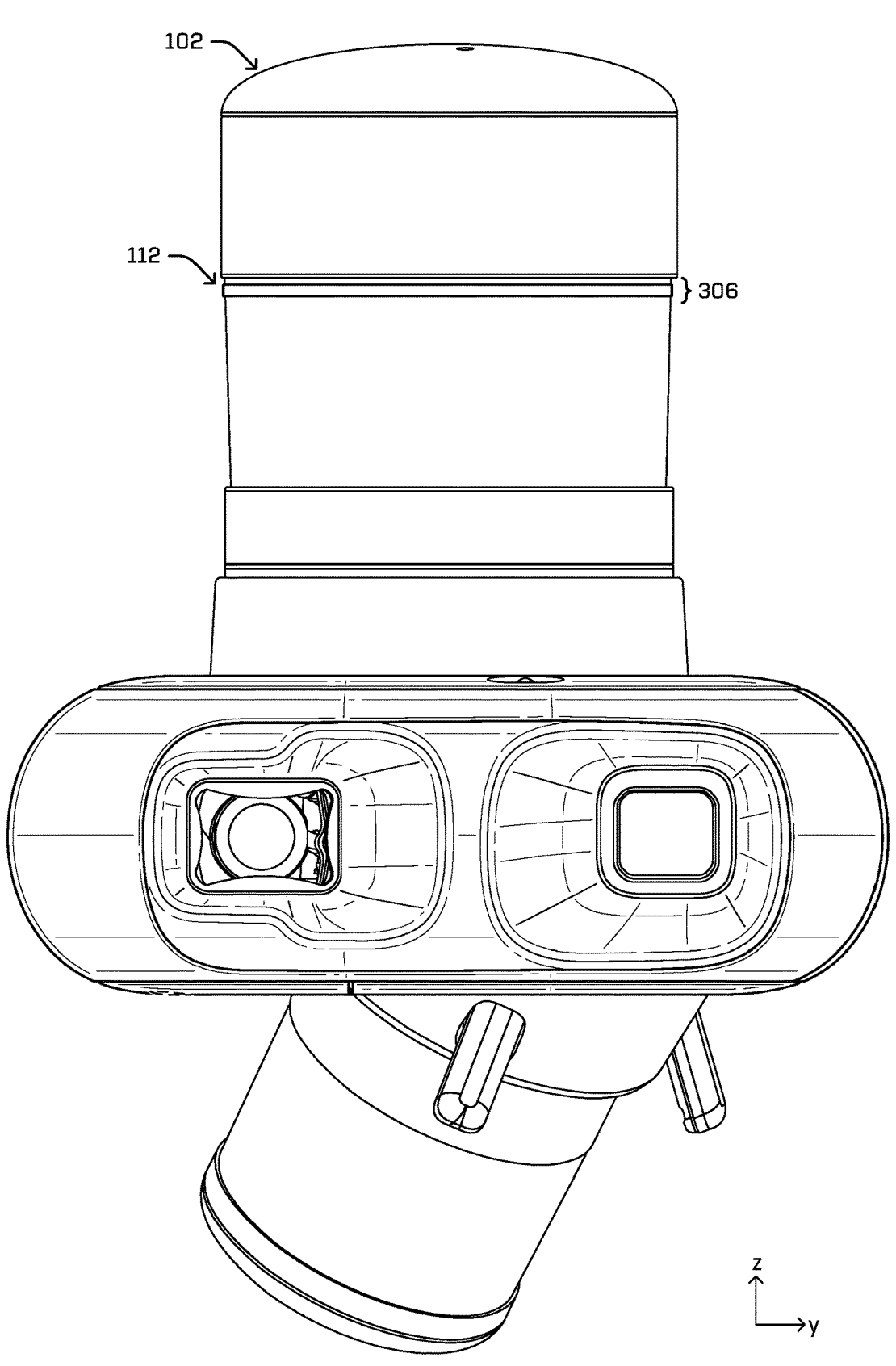
FIG. 5 illustrates a third side view of the cleaning mechanism for cleaning the sensor assembly of the vehicle of FIG. 1, according to examples of the present disclosure.

FIG. 5 illustrates a side view of the sensor assembly 102, which may represent a front of the sensor assembly 102. The wiper 112 is shown in the resting state, within the zone 306 on the sensor window 106 so as to not obstruct the usable portion of the FoV 200 of the sensor(s).

Figure 6:
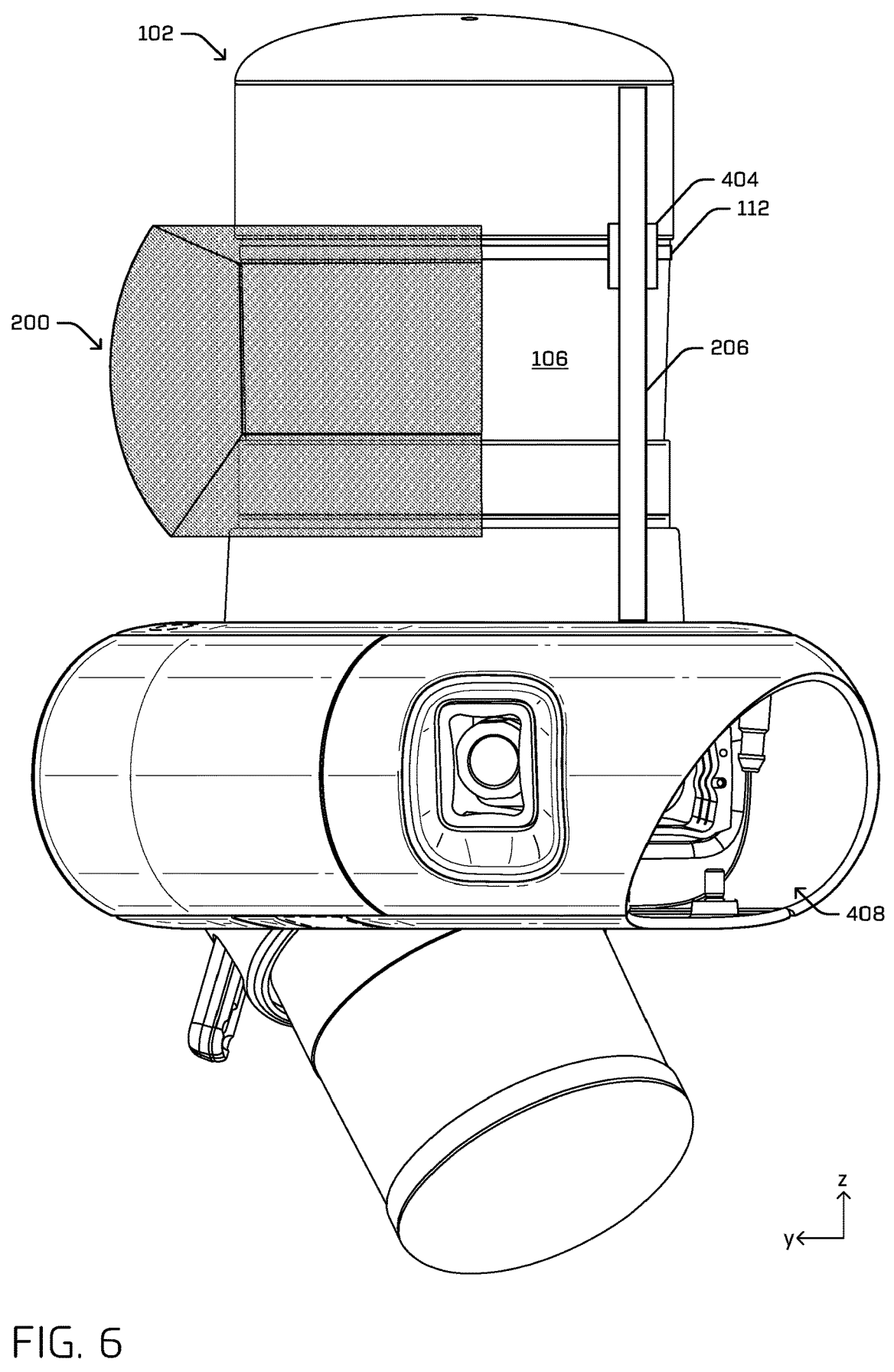

FIG. 6 illustrates a side view of the sensor assembly 102, which may represent a back of the sensor assembly 102. The rail 206 is shown coupled to the sensor assembly 102 that is outside the usable portion of the FoV 200. The mounting interface 408 is further shown for coupling the sensor assembly 102 to the vehicle 100.

Figure 7:
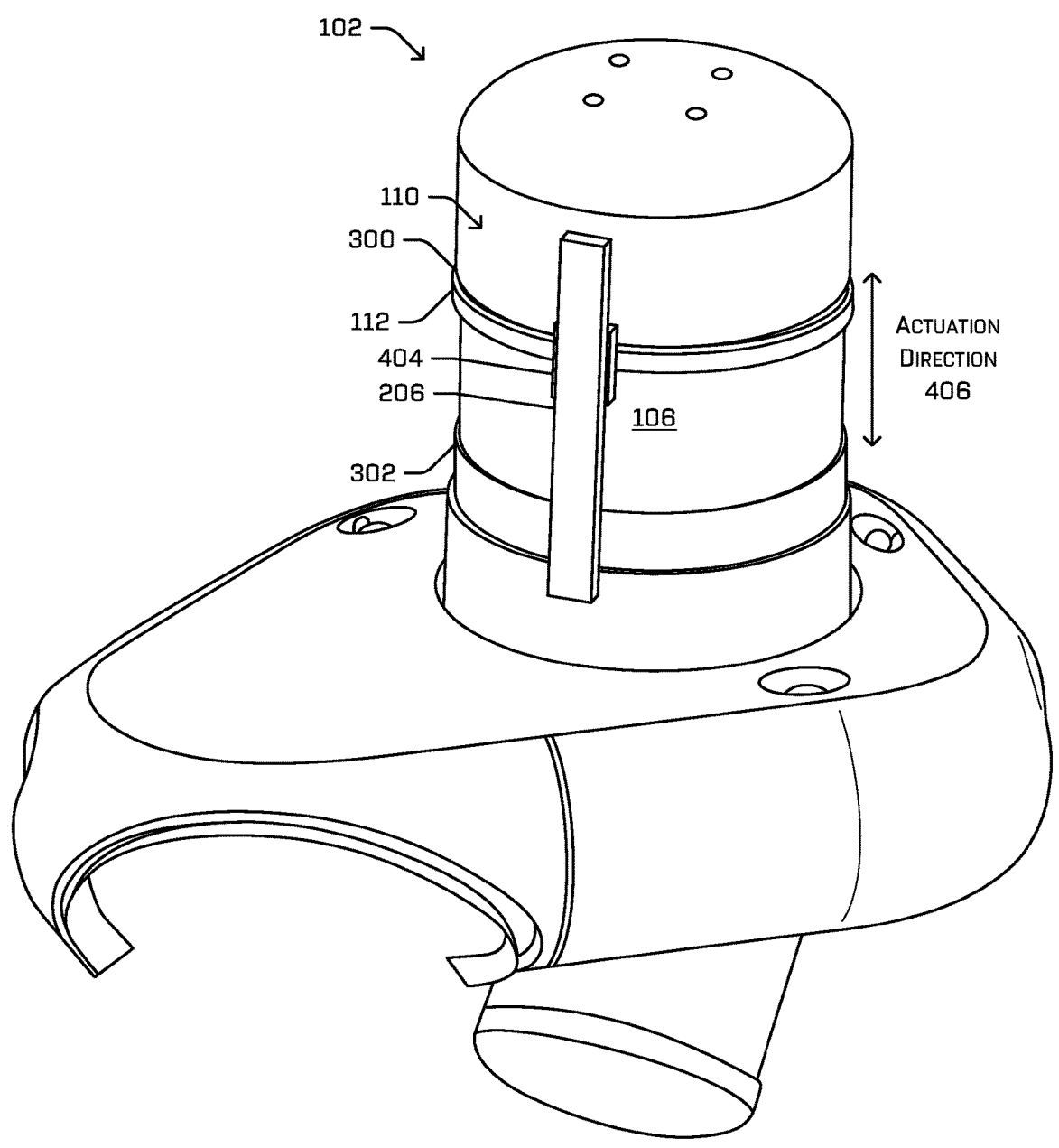
FIG. 7 illustrates a perspective view of the cleaning mechanism for cleaning the sensor assembly of the vehicle of FIG. 1, showing the cleaning mechanism in a first position, according to examples of the present disclosure.

FIG. 7 illustrates a rear perspective view of the sensor assembly 102, showing the wiper 112 in the resting state, proximate to the top 300 of the sensor window 106, and prior to being actuated to clean the sensor window 106. From the resting state, upon actuation of the actuator(s), the carriage 404 may translate along or within the rail 206 towards the bottom 302, in the actuation direction 406. As the carriage 404 moves, the wiper 112 traverses over the sensor window 106 to clean the sensor window 106. During this time, the sprayers 114 of the sensor assembly 102 may spray fluid onto the sensor window 106 to further assist in cleaning the sensor window 106 or riding the sensor window 106 of debris.

Figure 8:
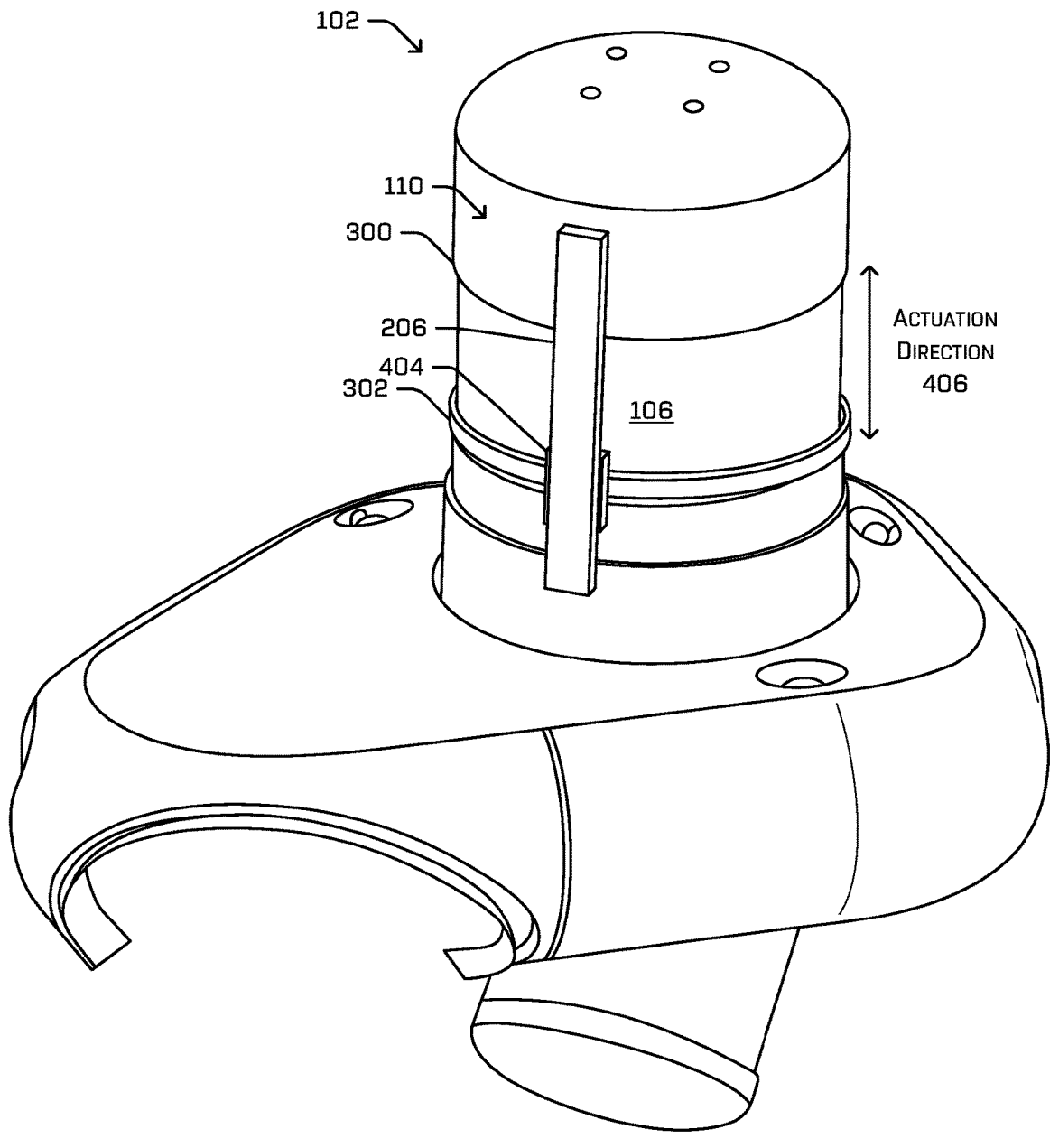
FIG. 8 illustrates a perspective view of the cleaning mechanism for cleaning the sensor assembly of the vehicle of FIG. 1, showing the cleaning mechanism in a second position, according to examples of the present disclosure.

FIG. 8 illustrates a rear perspective view of the sensor assembly 102, showing the wiper 112 proximate to the bottom 302 of the sensor window 106. For example, from the resting state as shown in FIG. 7, the carriage 404 may move along the rail 206 and translate, in the actuation direction 406, towards the bottom 302 of the sensor window 106. Once the wiper 112 (or the carriage 404) reaches the bottom 302, the carriage 404 may translate in the actuation direction 406 towards the top 300 to complete a cleaning cycle. However, in other instances, the wiper 112 may remain in the position shown in FIG. 8. In this sense, the wiper 112 may clean the sensor window 106 following a single pass over the sensor window 106, as compared to multiple passes. However, the sensor window 106 may have a zone (similar to the zone 306) proximate the bottom 302 in which the wiper 112 rests while not cleaning in order to not obstruct the usable portion of the FoV 200.

Figure 9:
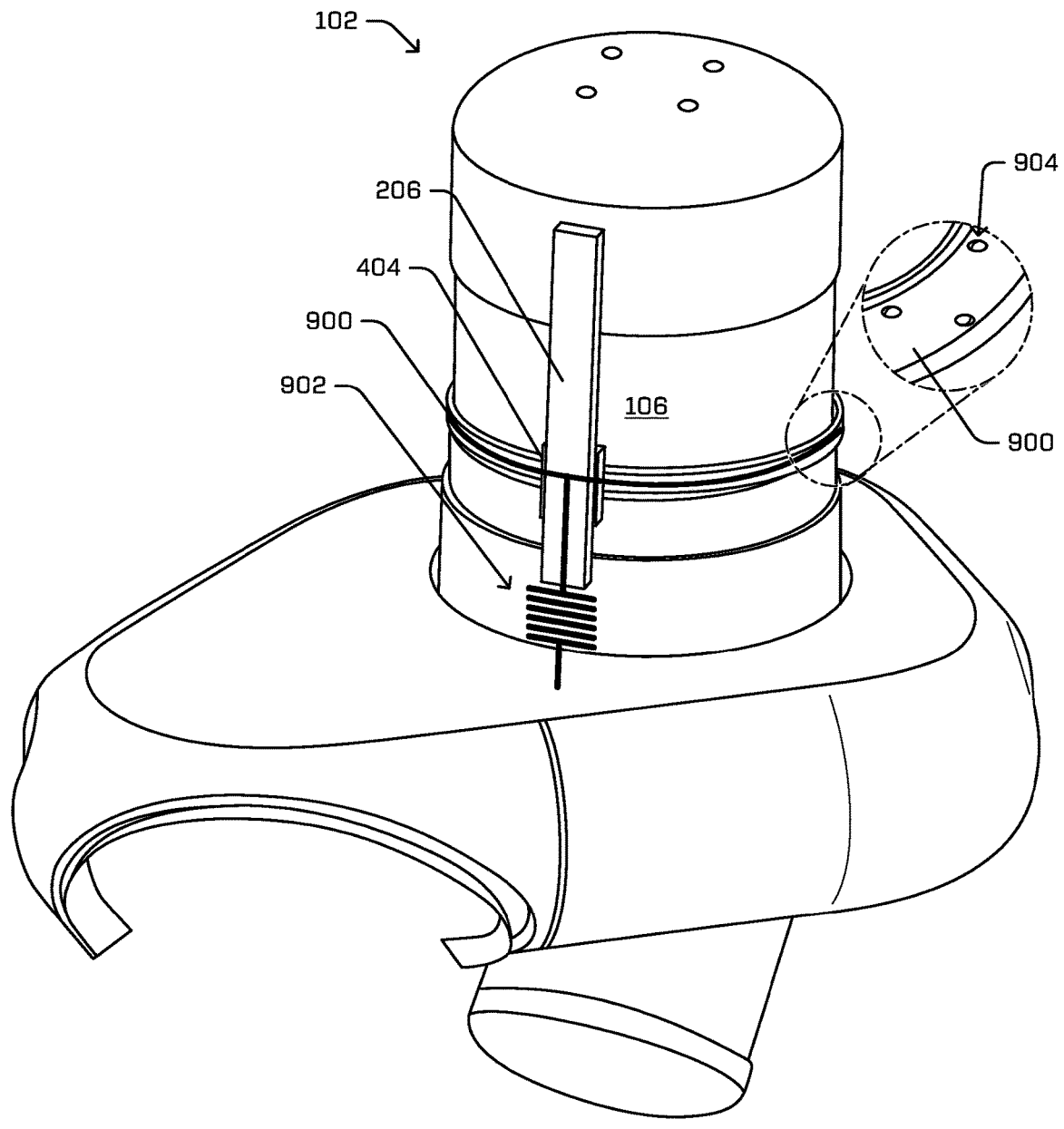
FIG. 9 illustrates an example conduit to route fluid to the cleaning mechanism for cleaning the sensor assembly of the vehicle of FIG. 1, according to examples of the present disclosure.

FIG. 9 illustrates sprayers being integrated within the wiper 112 of the cleaning mechanism 110. For example, compared to the sprayers 114 being included within a housing of the sensor assembly 102 (as discussed in FIG. 1), FIG. 9 illustrates that sprayers (e.g., nozzles) may be integrated with or other coupled to, the wiper 112. For example, conduit 900 may route between the sensor assembly 102, along the rail 206, to the wiper 112. Additionally, or alternatively, the conduit 900 may couple to the carriage 404. For example, clamps or other brackets may secure the conduit 900 to the carriage 404 such that the conduit 900 moves (e.g., extends and retracts in the Z-direction) during movement of the carriage 404.

The conduit includes a coil 902 that allows the conduit 900 to extend during actuation of the wiper 112 in the actuation direction 406. That is, as the wiper 112 translates towards the top 300 of the sensor window 106, the coil 902 provides slack to the conduit 900. As shown, the conduit 900 may traverse along an outside edge of the wiper 112, so as to encircle (or at least partially encircle) the sensor window 106.

The conduit 900 include nozzles 904 that spray fluid onto the sensor window 106. In some instances, the nozzles 904 may be located on a top or bottom surface of the wiper 112 (e.g., facing the top 300 of the sensor window 106 and/or the bottom 302 of the sensor window 106). The nozzles 900 may be spaced apart from one another, around a length of the conduit 900, so as to spray fluid onto the sensor window 106.

In some instances, the conduit 900 may couple to the wiper 112 using fasteners. Alternatively, the conduit 900 (or other like channel) may be integrated within the wiper 112 and the wiper 112 itself may include the sprayers (or nozzles). For example, the wiper 112 may include channels that route the fluid through the wiper 112, and in such instances, the conduit 900 may couple to the wiper 112. However, although a particular embodiment of the conduit 900 is shown, different embodiments are envisioned. For example, the conduit 900 may be routed differently than shown (e.g., from a top of the sensor assembly, within the rail 206, etc.), and/or the conduit 900 may couple to the wiper 112 differently than shown.

Figure 10:
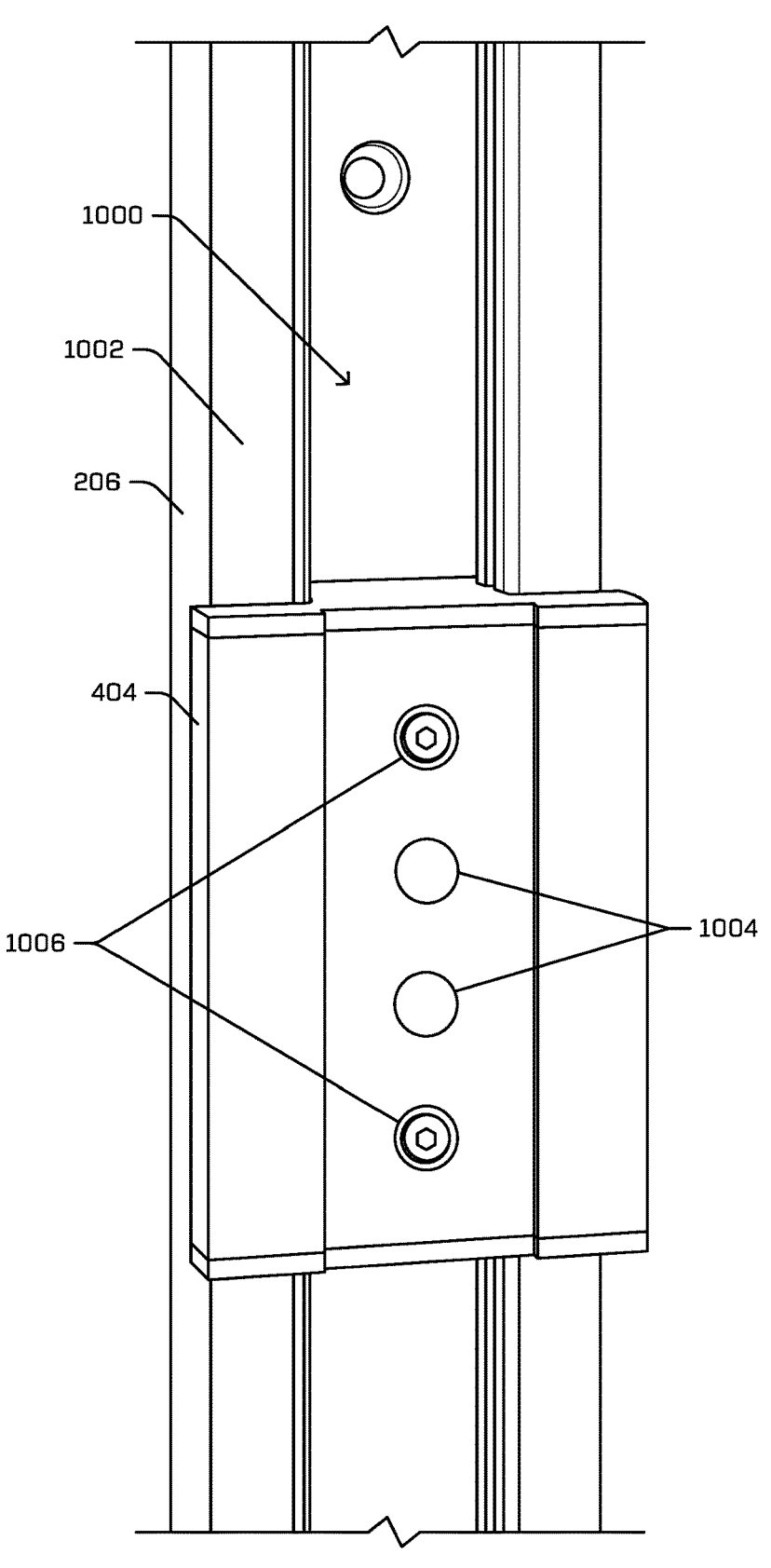
FIG. 10 illustrates a first perspective view of an example carriage and an example rail of the cleaning mechanism for cleaning the sensor assembly of the vehicle of FIG. 1, according to examples of the present disclosure.

FIG. 10 illustrates an engagement between the rail 206 and the carriage 404. The rail 206 may include, or define, a channel 1000 that extends along at least a portion of a length of the rail 206. The channel 1000 may include features, such as a tabs, slots, grooves, slits, and the like that receive or otherwise engage with complimentary features of the carriage 404. For example, the carriage 404 may include wheels, bearings, flanges, tabs, bushings, and so forth that engage with the channel 1000 for aligning the carriage 404 on or within the channel 1000 such that the carriage 404 is permitted to translate along the rail 206 (in the actuation direction 406).

The view shown in FIG. 10 may represent an interior facing side (or surface) of the rail 206 and the carriage 404. For example, the interior facing side may be oriented towards the sensor window 106, or more generally, the sensor assembly 102. The channel 1000 may be formed within (or by) an interior surface 1002 of the channel 1000.

As will be discussed herein, the carriage 404 couples to or receives the wiper 112, which is omitted in FIG. 10 to more clearly illustrate components of the rail 206 and the carriage 404. In some instances, the carriage 404 includes receptacles 1004 for receiving fasteners disposed through a bracket that couples the wiper 112 to the carriage 404. Although two receptacles 1004 are shown, the carriage 404 may include more than or less than two receptacles 1004. In some instances, the receptacles 1004 may be threaded to receive the fasteners, or may include other female or male type connectors for coupling the bracket to the carriage 404.

The carriage 404 may also include two axles 1006 for coupling wheels to the carriage 404. As will be explained herein, the wheels may engage with tracks of the channel 1000 to align the carriage 404 within the channel 1000 as the carriage 404 translates along a length of the rail 206.

Figure 11:
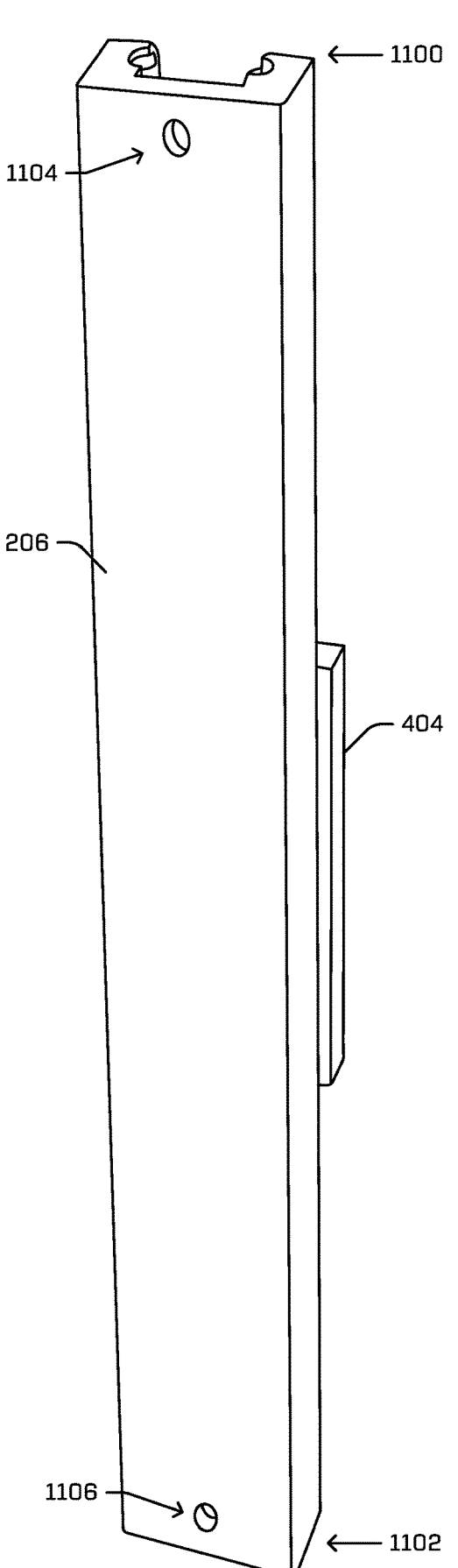
FIG. 11 illustrates a second perspective view of the carriage and the rail of the cleaning mechanism of FIG. 10, according to examples of the present disclosure.

FIG. 11 illustrates an engagement between the rail 206 and the carriage 404. The view shown in FIG. 11 may represent an exterior facing side (or surface) of the rail 206 and the carriage 404. For example, the exterior facing side may be oriented away from the sensor window 106, or more generally, the sensor assembly 102.

The rail 206 includes a length that extends between a first end 1100 and a second end 1102 (e.g., in the Z-direction). In some instances, the first end 1100 couples to the first housing 400, and the second end 1102 couples to the second housing 402. For example, a first hole 1104 is shown disposed through the rail 206, proximate to the first end 1100, and a second hole 1106 is shown disposed through the rail 206, proximate to the second end 1102. Fasteners, for example, may be disposed through the first hole 1104 and into the first housing 400, and/or through the second hole 1106 and into the second housing 402 for coupling the rail 206 the sensor assembly 102.

Although a particular size and/or shape of the rail 206 and the carriage 404 are shown, other variations are envisioned.

For example, the rail 206 and the carriage 404 may include a similar width as one another, or the rail 206 and the carriage 404 may include different widths than other another (as shown in FIG. 11).

Figure 12:
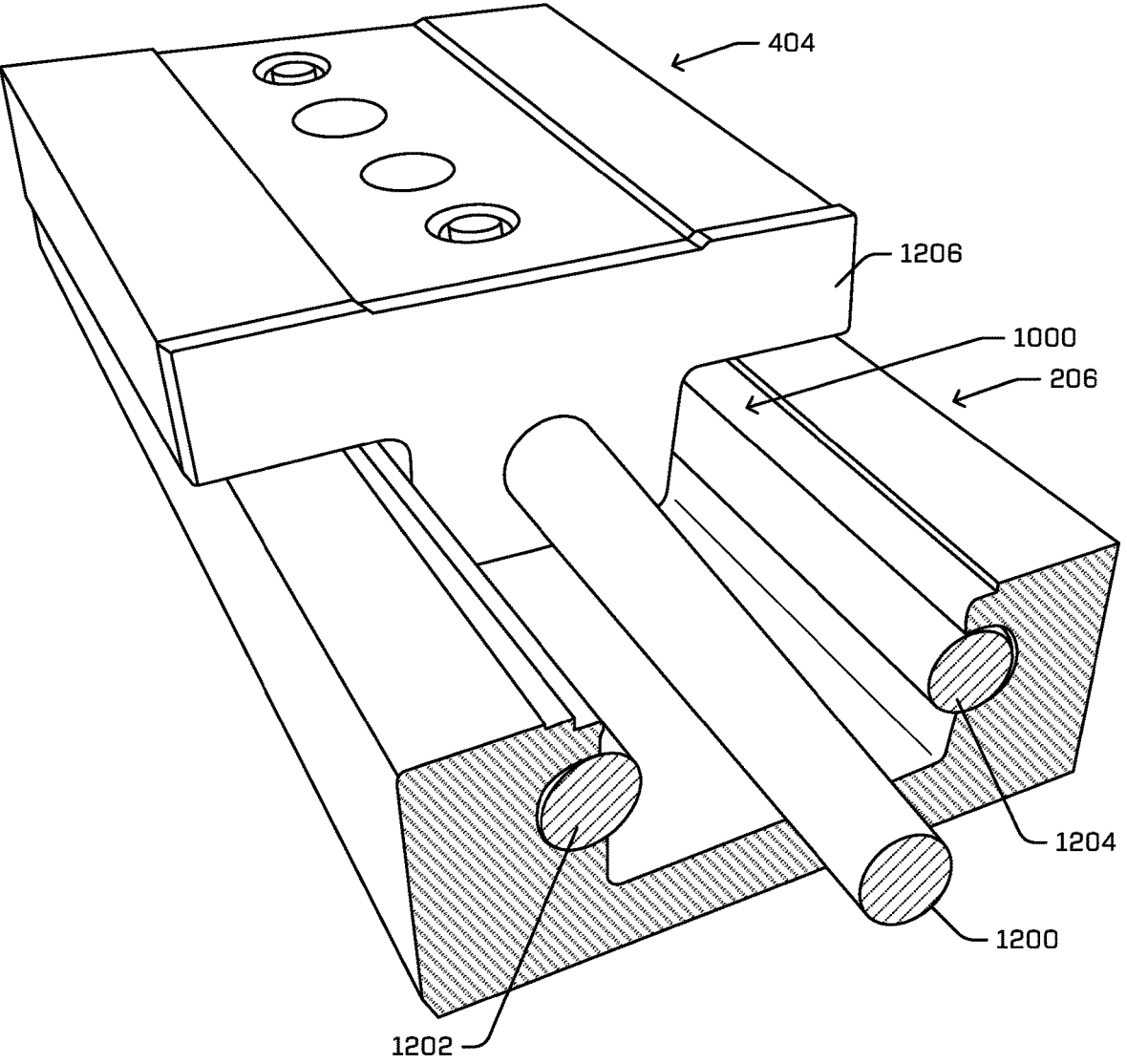
FIG. 12 illustrates a third perspective view of the carriage and the rail of the cleaning mechanism of FIG. 10, according to examples of the present disclosure.

FIG. 12 illustrates an engagement between the rail 206 and the carriage 404. The view shown in FIG. 12 may represent an end view of the rail 206, showing a portion of the carriage 404 residing within the channel 1000. For example, the channel 1000 may include a depth within which a portion of the carriage 404 resides. Additionally, FIG. 12 illustrates an actuator 1200 coupled to the carriage 404. In some instances, the actuator 1200 represents a linear actuator coupled to an end 1206 of the carriage 404. Accordingly, as the actuator 1200 extends and retracts, such as in the actuation direction 406, the carriage 404 may correspondingly move within the rail 206. In some instances, the actuator 1200 couples to the end 1206 of the carriage 404 via brackets, mounts, and so forth.

In other instances, the cleaning mechanism 110 may include other various mechanisms for traversing the wiper 112 over the sensor window 106. For example, the rail 206 may not be affixed to the sensor assembly 102, but rather, a telescopic actuator may extend and retract the wiper 112 over the sensor window 106. In this instance, two or more telescoping supports may couple to the wiper 112 (e.g., diametrically opposed from one another), to translate the wiper 112 over the sensor window 106. In such instances, when not in use, the telescoping supports may not occlude portions of the FoV of the LIDAR sensor(s), such that a FOV of the LIDAR sensor(s) is 360 degrees and the cleaning mechanism 110 may be used in other applications. As another example, the wiper 112 may include drive rollers that drive along an exterior surface of the sensor window 106.

The actuator 1200 is shown residing within the channel 1000. For example, the actuator 1200 may reside within the depth of the channel 1000 so as to protect the actuator 1200 from the environment (e.g., weather, obstacles, etc.) and/or contribute to an aesthetic appearance of the cleaning mechanism 110. Although a linear actuator is shown and discussed, other actuators (e.g., screw drive) are envisioned. In such instances, a rod of the screw drive may appropriately engage with a receptacle of the carriage 404 such that rotation of the rod causes the carriage 404 to translate along the rail 206.

The rail is shown including a first track 1202 and a second track 1204, spaced apart from one another along a width of the channel 1000. The first track 1202 and the second track 1204 may extend in a lengthwise direction along the rail 206, between the first end 1100 and the second end 1102. In some instances, the first track 1202 and the second track 1204 may receive wheels of the carriage 404 for aligning the carriage 404 within the channel 1000 and/or on the rail 206. However, although the first track 1202 and the second track 1204 are shown including certain features (e.g., rounded, bulbous shape), the first track 1202 and the second track 1204 may include other shapes. For example, rather than the first track 1202 and the second track 1204 protruding into channel 1000, the first track 1202 and the second track 1204 may be formed within sidewalls of the channel 1000. Furthermore, although the first track 1202 and the second track 1204 are shown on the sidewalls of the channel 1000, the first track 1202 and the second track 1204 may be located on a bottom of the channel 1000. Still, the channel 1000 may be "C-shaped," "I-shaped," and so forth for receiving corresponding features of the carriage 404. Accordingly, variations other than those shown are envisioned.

Figure 13A:
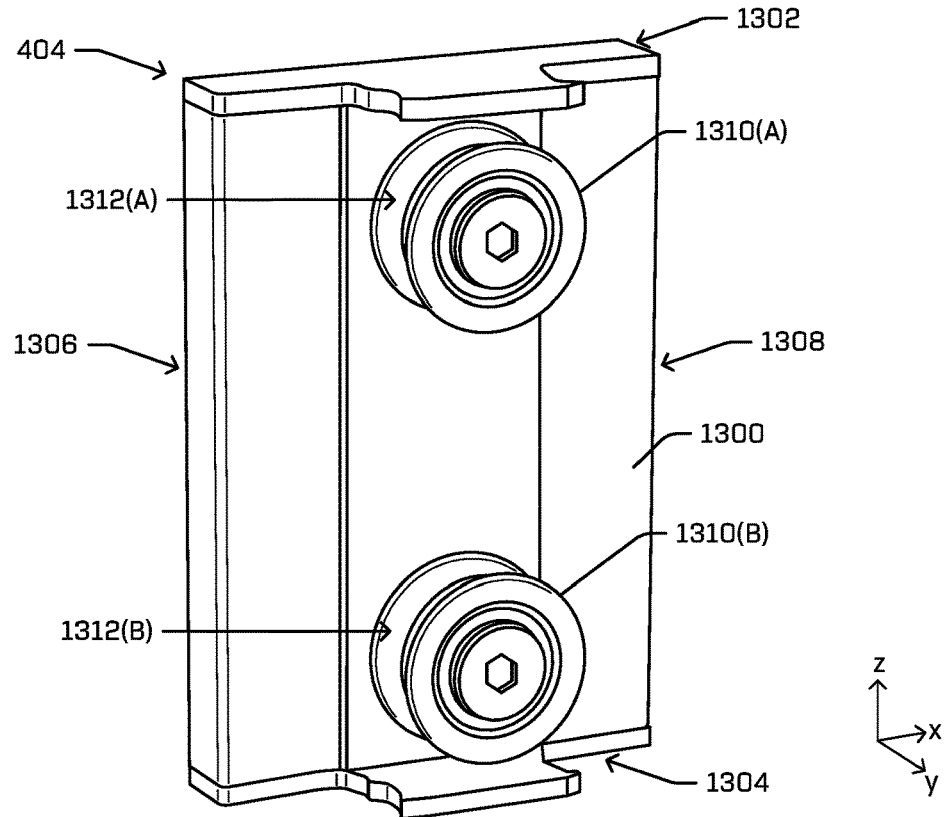
FIG. 13A illustrates a first perspective view of the carriage of the cleaning mechanism of FIG. 10, according to examples of the present disclosure.
Figure 13B:
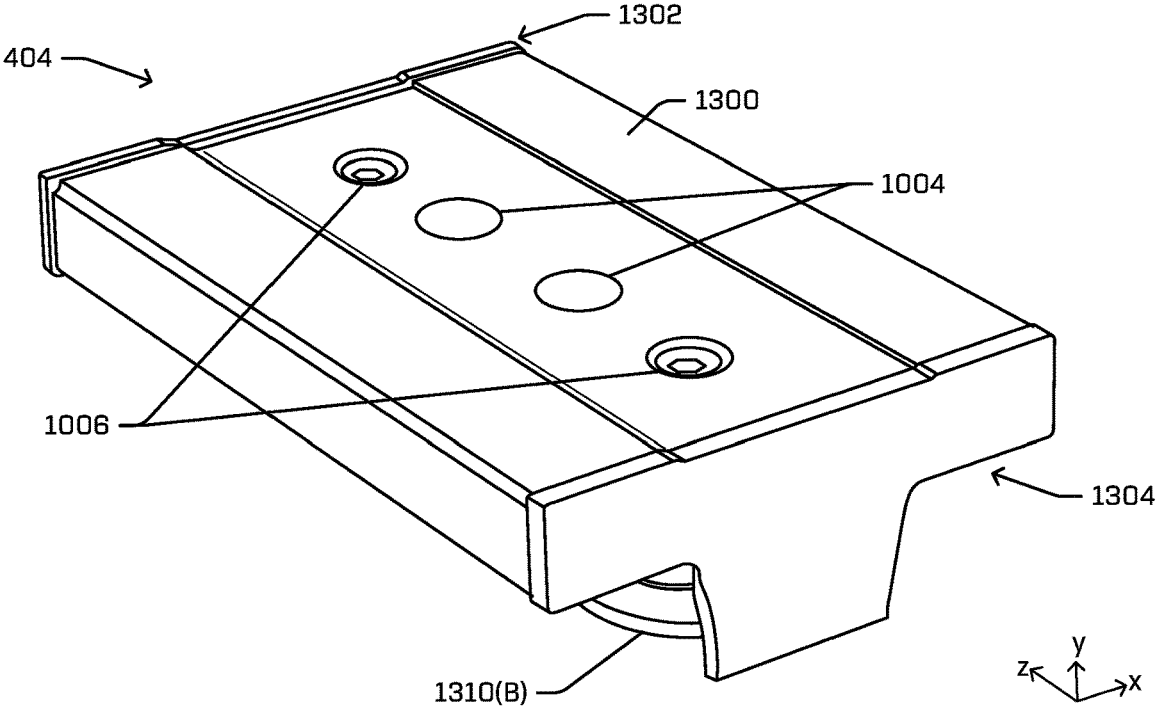
FIG. 13B illustrates a second perspective view of the carriage of the cleaning mechanism of FIG. 10, according to examples of the present disclosure.

FIGS. 13A and 13B illustrate the carriage 404. In some instances, FIG. 13A illustrates an inner side of the carriage 404 that faces the rail 206 (or the channel 1000), while FIG. 13B illustrates an exterior side of the carriage 404 that faces the sensor assembly 102.

The carriage 404 may be formed from a unitary body, or frame 1300, that extends between a first end 1302 and a second end 1304. The actuator 1200 may couple to the frame 1300 at the first end 1302 or the second end 1304 (which may correspond to the end 1206). Additionally, the frame 1300 may include a first side 1306 and a second side 1308. A first wheel 1310(A) and a second wheel 1310(B) are shown coupled to the frame 1300. In some instances, the first wheel 1310(A) may couple to the frame 1300 proximate to the first end 1302, while the second wheel 1310(B) may couple to the frame 1300 proximate to the second end 1304. In some instances, the first wheel 1310(A) and the second wheel 1310(B) may be centrally located between the first side 1306 and the second side 1308.

The first wheel 1310(A) includes a first groove 1312(A) for engaging with the first track 1202 and the second track 1204. Similarly, the second wheel 1310(B) includes a second groove 1312(B) for engaging with the first track 1202 and the second track 1204. The first wheel 1310(A) and the second wheel 1310(B) are rotationally coupled to the frame 1300, for example, via the axles 1006 such that the first wheel 1310(A) and the second wheel 1310(B) rotate during translation of the carriage 404 along the rail 206. The axles 1006 may represent fasteners (e.g., screws, bolts, etc.) that rotationally couple the first wheel 1310(A) and the second wheel 1310(B) to the frame 1300. As the actuator 1200 extends and retracts, the first groove 1312(A) and the second groove 1312(B) engage with the first track 1202 and the second track 1204, causing the first wheel 1310(A) and the second wheel 1310(B) to rotate. In turn, the carriage 404 translates along the rail 206.

Although two wheels are shown, the carriage 404 may include more than two wheels or less than two wheels. Additionally, although a particular mechanism is shown for coupling carriage 404 and the rail 206, as mentioned above, other mechanisms are envisioned. For example, the rail 206 may include an "I-shaped" cross-sectional design, and wheels of the carriage 404 may engage with the rail 206 accordingly. Still, in some instances, the rail 206 may include an "I-shaped" cross-sectional design whereas the carriage 404 may include a "C-shaped" cross-sectional design that engages with the rail 206. Additionally, although a particular shape of the carriage 404 is shown, other shapes are envisioned (e.g. square). The receptacles 1004 are further shown for coupling the bracket of the wiper 112 to the frame 1300.

Figure 14A:
FIG. 14A illustrates a first perspective view of an example wiper of the cleaning mechanism for cleaning the sensor assembly of the vehicle of FIG. 1, according to examples of the present disclosure.
Figure 14B:
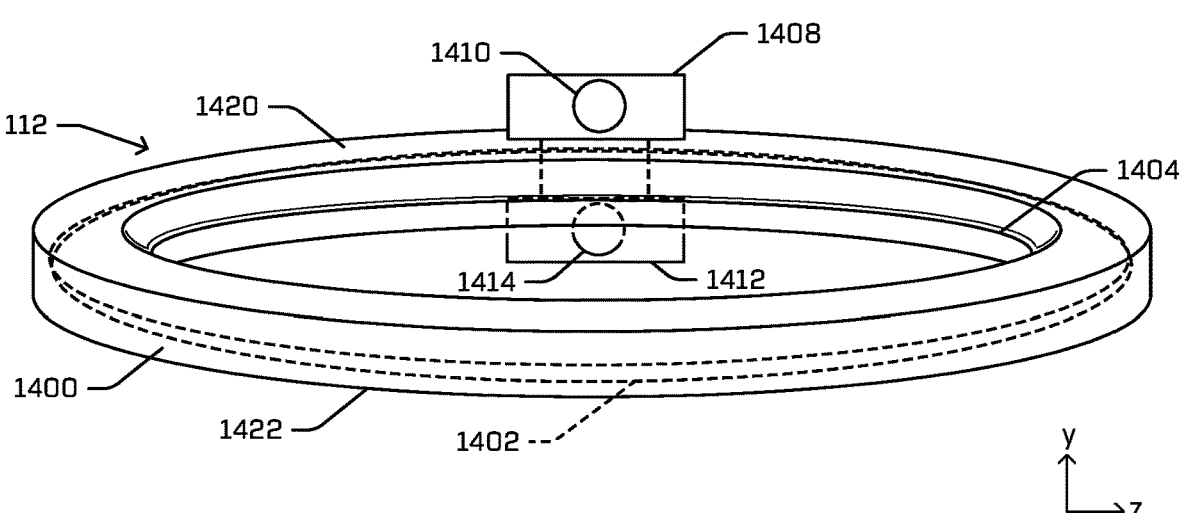
FIG. 14B illustrates a second perspective view of the wiper of FIG. 14A, according to examples of the present disclosure.
Figure 14C:
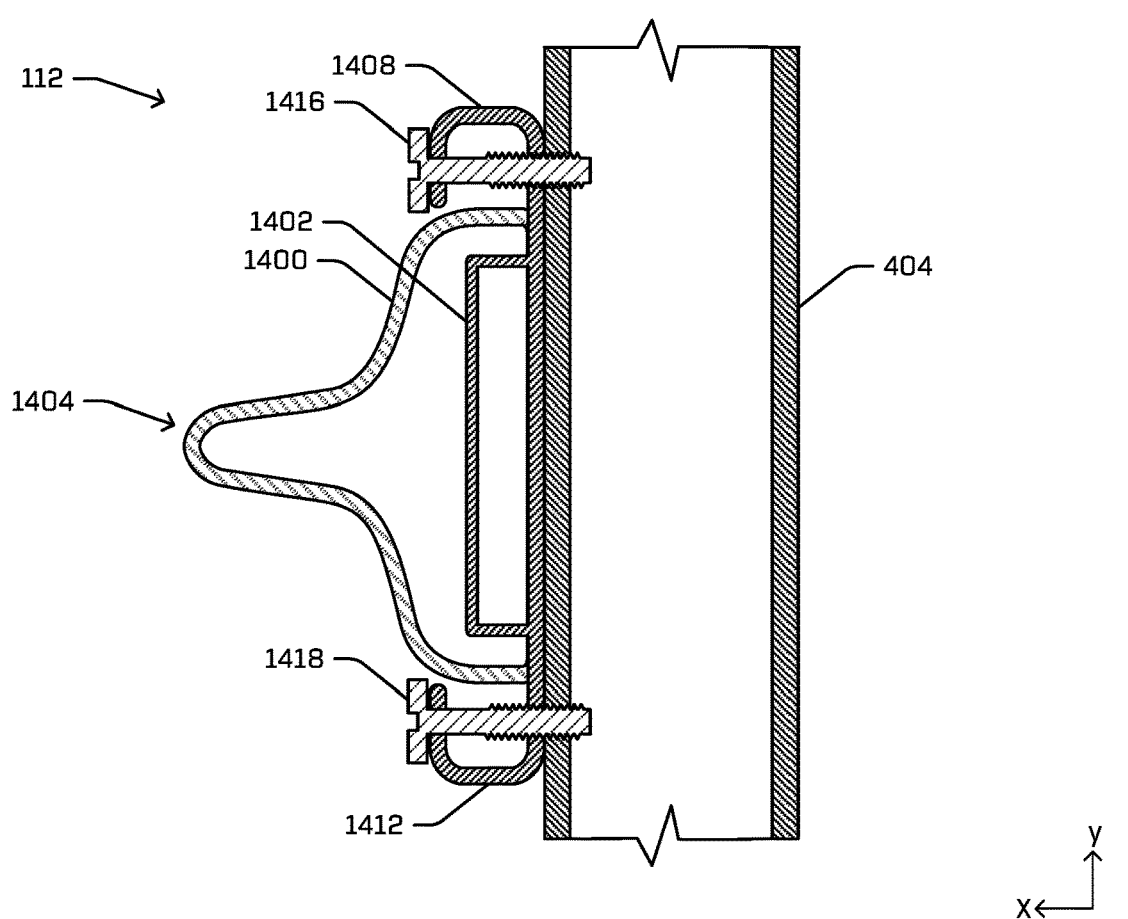
FIG. 14C illustrates a coupling of the wiper of FIG. 14A to the carriage of FIG. 10, according to examples of the present disclosure.

FIGS. 14A-14C illustrate various views of the wiper 112. In some instances, FIG. 14A illustrates a top or bottom view of the wiper 112, FIG. 14B illustrates a perspective view of the wiper 112, and FIG. 14C illustrates a coupling of the wiper 112 to the carriage 404.

As shown, and in some instances, the wiper 112 includes a substantially circular shape. In some instances, the wiper 112 may include a rubber portion 1400 and a ring portion 1402. The rubber portion 1400 may be overmolded around the ring portion 1402 and engage with the sensor window 106. The ring portion 1402, which may be made of metal or a stiffer material than the rubber portion 1400, may provide stability to the wiper 112. The wiper 112, or the rubber portion 1400, may also include a wiper blade 1404 disposed around an inner periphery or perimeter of the wiper 112. For example, the ring portion 1402 may substantially prevent the wiper 112 bending as the wiper blade 1404 translates over the sensor window 106. The wiper blade 1404 is configured to engage with the sensor window 106. The wiper blade 1404 may include a tip or other profile that serves to clean the sensor window 106.

The wiper 112 also includes a bracket 1406 for coupling the wiper 112 to the carriage 404. The bracket 1406 may couple to the ring portion 1402, and in doing so, coupling the bracket 1406 to the carriage 404 correspondingly couples the wiper 112 to the carriage 404. In some instances, the ring portion 1402 and the bracket 1406 may be a single component, such that the bracket 1406 may protrude from the rubber portion 1400. The bracket 1406 is also shown including at least a first flange 1408 having a first hole 1410, and a second flange 1412 having a second hole 1414. The first flange 1408 is shown being disposed above a top 1420 of the rubber portion 1400 (e.g., external to the rubber portion 1400), while the second flange 1412 is shown being disposed above a bottom 1422 of the rubber portion 1400 (e.g., external to the rubber portion 1400).

The first hole 1410 is sized and shaped to receive a first fastener 1416, while the second hole 1414 is sized and shaped to receive a second fastener 1418. The first fastener 1416 and the second fastener 1418 may be received within the receptacles 1004 of the carriage 404 for coupling the wiper 112 to the carriage 404. Although two holes and two fasteners are described for coupling the wiper 112 to the carriage 404, more than two holes and/or fasteners may be included. Still, the wiper 112 may couple to the carriage 404 using additional or alternative mechanisms (e.g., press-fit, snap fit, pressure fit, etc.).

Although the wiper blade 1404 is shown being disposed around an entirety of the wiper 112, the wiper blade 1404 may engage with less than an entirety of the sensor window 106 (e.g., less than 360 degrees). For example, the wiper blade 1404 may only extend 270 degrees that corresponds to the usable portion of the FoV 200 of the sensor(s). Additionally, the rubber portion 1400 and/or the ring portion 1402 may extend less than 360 degrees as well. In such instances, springs or turnbuckle tensioners may be used to attach opposing ends of the wiper 112 together (as shown and discussed in FIG. 15). In these instances, the amount of the wiper 112 in contact with the sensor window 106 may be reduced, thereby leading to less friction generated between the wiper blade 1404 and the sensor window 106. This may allow for less work to be performed by the actuator(s) 1200 and/or the ability for the wiper 112 to oscillate at a high frequency over the sensor window 106.

Still, although the ring portion 1402 is shown being molded within the rubber portion 1400, the ring portion 1402 may reside external to the rubber portion 1400 (e.g., around an outer perimeter of the wiper 112). The ring portion 1402 may be made from metal, plastics, composites, or any combination thereof. The ring portion 1402 may include a piece of ringed material, or may represent a cable embedded within the rubber portion 1400. The rubber portion 1400 may include any suitable rubbers, and/or silicone.

Figure 15:
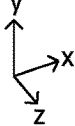
FIG. 15 illustrates a coupling of the wiper of FIG. 14A to the carriage of FIG. 10, which is engaged with the rail of FIG. 10, according to examples of the present disclosure.

FIG. 15 illustrates the carriage 404 engaged within the rail 206, and the wiper 112 coupled to the carriage 404 via the bracket 1406.

Figure 16:
FIG. 16 illustrates an example tensioning mechanism of a cleaning mechanism for cleaning the sensor assembly of the vehicle of FIG. 1, showing the cleaning mechanism in a second position, according to examples of the present disclosure.

FIG. 16 illustrates an alternative embodiment of a wiper 1600. In some instances, the wiper 1600 may be similar to the wiper 112 discussed hereinabove. For example, the wiper 1600 may include a rubber portion 1602 and a ring portion 1604. However, compared to the wiper 112, the wiper 1600 is shown having a tensioning mechanism 1606 for coupling two ends of the wiper 1600 together. As shown, the wiper 1600 may include a first end 1608 and a second end 1610. The wiper 1600, or rather the rubber portion 1602 and/or the ring portion 1604, may not be 360 degrees so as to fully encircle and/or engage with the sensor window 106. Instead, the tensioning mechanism 1606 couples the first end 1608 and the second end 1610 together. The first end 1608 and the second end 1610 may include brackets for receiving a fastener 1612. Tightening the fastener 1612 may bring the first end 1608 and the second end 1610 closer to one another, while loosening the fastener 1612 may allow the first end 1608 and the second end 1610 to separate. In doing so, a tension of the wiper 1600 may be adjusted to either increase or decrease a force in which the wiper 1600 grips onto the sensor window 106.

A bracket 1614 is further shown coupled to the wiper 1600 for securing the wiper 1600 to the carriage 404, for example. In some instances, the tensioning mechanism 1606 may be part of, or integrated within, the bracket 1614. In some instances, the bracket 1614 may be located differently than shown, such as being located on either side of the first end 1608 or the second end 1610. Still, although a particular type of tensioning mechanism is shown, other mechanisms are envisioned (e.g., turnbuckle, circular spring encircling the wiper 1600, etc.).

Figure 17A:
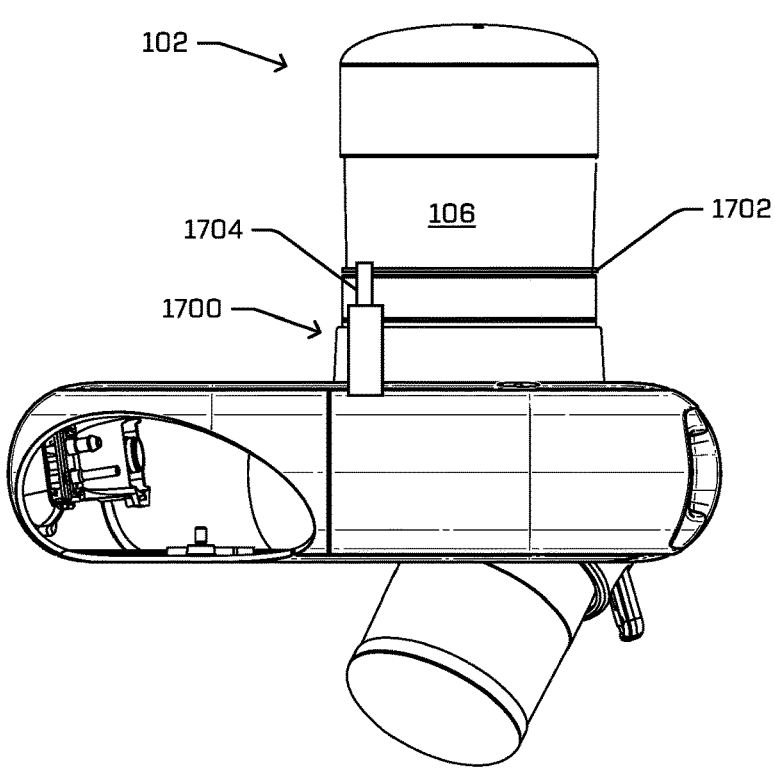
FIG. 17A illustrates a first perspective view of an example cleaning mechanism for cleaning an example sensor assembly of the vehicle, showing an actuator of the cleaning mechanism in a first position, according to examples of the present disclosure.
Figure 17B:
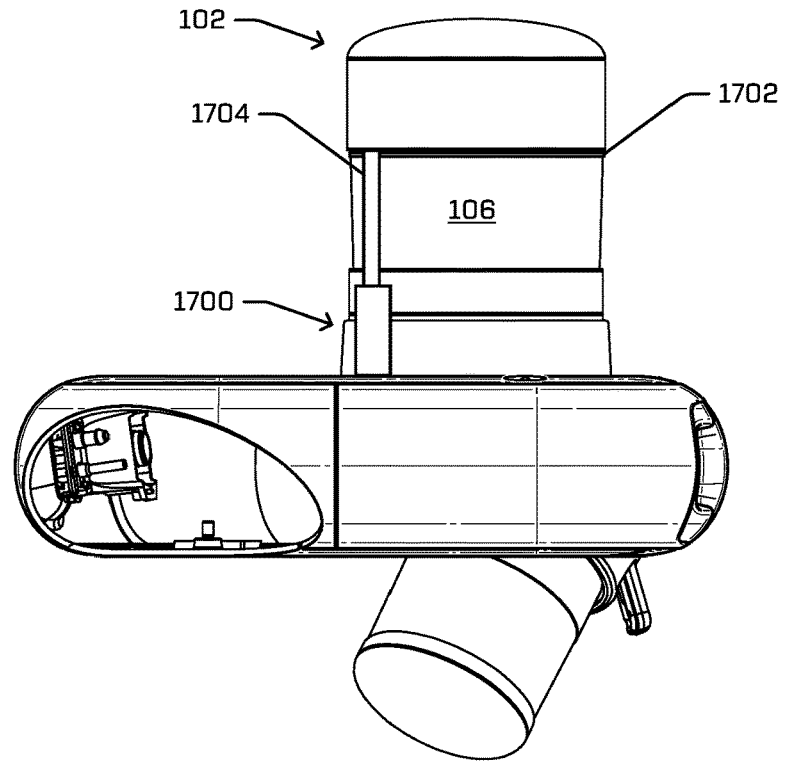
FIG. 17B illustrates a second perspective view of the cleaning mechanism of FIG. 17A, showing the actuator of the cleaning mechanism in a second position, according to examples of the present disclosure.

FIGS. 17A and 17B illustrate an alternative embodiment of a cleaning mechanism 1700. In some instances, the cleaning mechanism 1700 may be similar to the cleaning mechanism 110 discussed hereinabove. For example, the cleaning mechanism 1700 may include a wiper 1702 that engages with the sensor window 106 of the sensor assembly 102. However, the cleaning mechanism 1700 may find use in applications in which a usable FoV of the sensor(s) is substantially 360 degrees. For example, as shown, the cleaning mechanism 1700 does not occlude any portions of a FoV of the sensors within the sensor assembly. More particularly, instead of using the rail 206 and the carriage 404, an actuator 1704 may couple directly to the wiper 1702. Here, the sensor(s) may not include any unused portion of the FoV, and accordingly, the wiper 1702 and the actuator 1704 may not occlude the FoV of the sensors.

In FIG. 17A, the wiper 1702 and the actuator 1704 are shown in a retracted state. In this position, the wiper 1702 may reside within a zone (e.g., the zone 306) so as to not occlude the FoV of the sensor(s). In FIG. 17B the wiper 1702 and the actuator 1704 are shown in an extend state in which the wiper 1702 is advanced towards the top of the sensor window 106. During this actuation, the wiper 1702 and the actuator 1704 may occlude portions of the usable FoV of the sensor(s). Although the actuator 1704 is shown at a certain location on the sensor assembly 102, the actuator may extend from the top of the sensor assembly 102. Still, more than one actuator may be used to translate the wiper 1702 over the sensor window 106. For example, another actuator may be diametrically opposed from the actuator 1704 to operate in unison with the actuator 1704 to extend and retract the wiper 1702.

Figure 18:
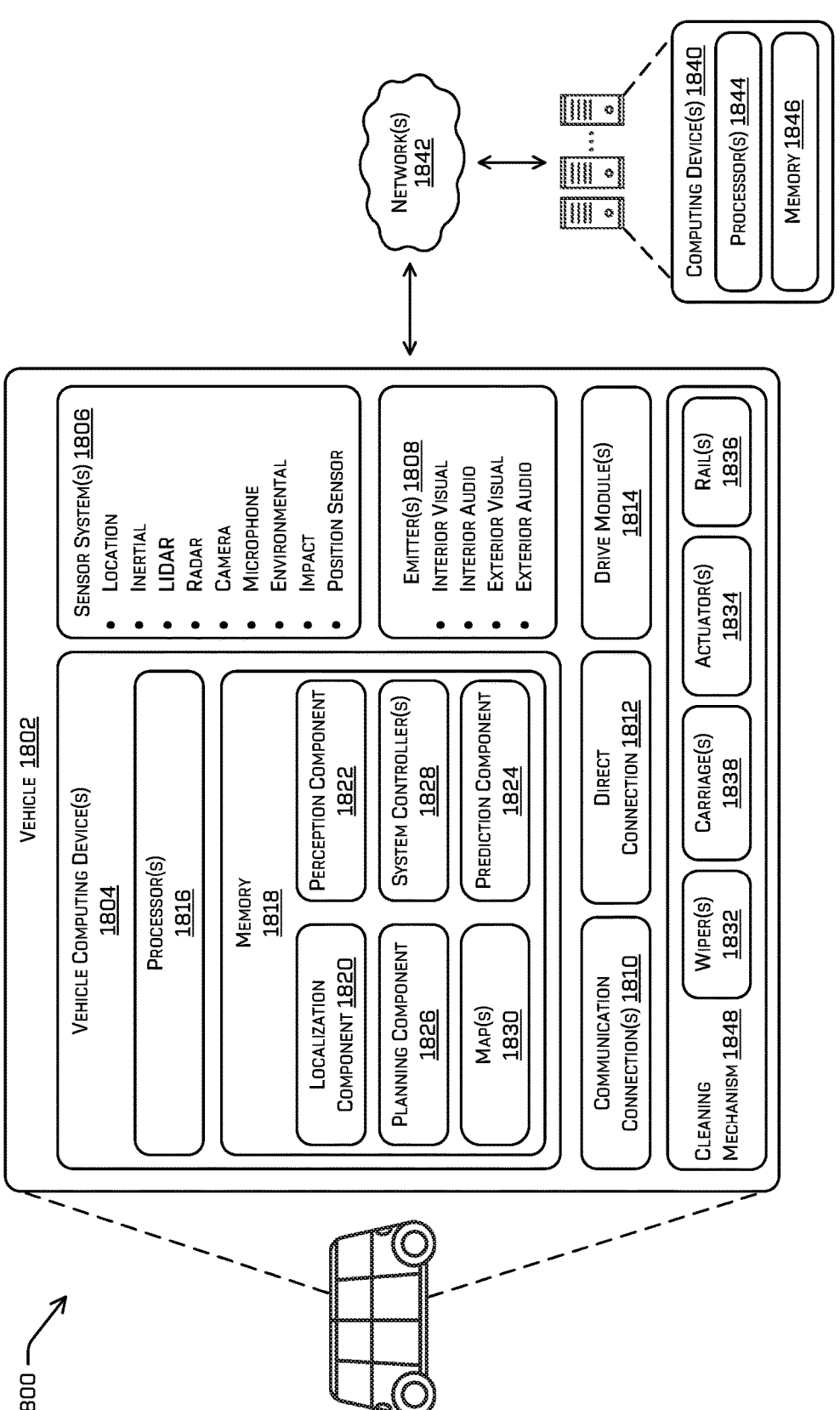
FIG. 18 illustrates a diagram showing an example architecture for vehicle systems including an example cleaning mechanism, according to examples of the present disclosure.

FIG. 18 is a block diagram of an example system 1800 for implementing the techniques described herein. In at least one example, the system 1800 can include a vehicle 1802. In the illustrated example system 1800, the vehicle 1802 is an autonomous vehicle; however, the vehicle 1802 can be any other type of vehicle. The vehicle 1802 may be representative of the vehicle 100 described hereinabove.

The vehicle 1802 can be a driverless vehicle, such as an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such examples, because the vehicle 1802 can be configured to control all functions from start to completion of the trip, including all parking functions, it may not include a driver and/or controls for driving the vehicle 1802, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 1802 can include one or more vehicle computing device(s) 1804, one or more sensor system(s) 1806, one or more emitter(s) 1808, one or more communication connection(s) 1810 (also referred to as communication devices and/or modems), at least one direct connection 1812 (e.g., for physically coupling with the vehicle 1802 to exchange data and/or to provide power), and one or more drive module(s) 1814. The one or more sensor system(s) 1806 can be configured to capture sensor data associated with an environment.

The one or more sensor system(s) 1806 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 1806 can include multiple instances of each of these or other types of sensors. For instance, the time-of-flight sensors can include individual time-of-flight sensors located at the corners, front, back, sides, and/or top of the vehicle 1802. As another example, the camera sensors can include multiple cameras disposed at various locations about the exterior and/or interior of the vehicle 1802. The one or more sensor system(s) 1806 can provide input to the vehicle computing device(s) 181804. The sensor system(s) 1806 may include, or be representative of, the sensor assembly 102 discussed in FIGS. 1-17B. For example, the sensor system(s) 1806 may include LIDAR sensor(s) disposed in the sensor assembly 102.

The vehicle 1802 can also include one or more emitter(s) 1808 for emitting light and/or sound. The one or more emitter(s) 1808 in this example include interior audio and visual emitters to communicate with passengers of the vehicle 1802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 1808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 1802 can also include one or more communication connection(s) 1810 that enable communication between the vehicle 1802 and one or more other local or remote computing device(s) (e.g., a remote teleoperation computing device) or remote services. For instance, the one or more communication connection(s) 1810 can facilitate communication with other local computing device(s) on the vehicle 1802 and/or the one or more drive module(s) 1814. Also, the one or more communication connection(s) 1810 may allow the vehicle 1802 to communicate with other nearby computing device(s) (e.g., other nearby vehicles, traffic signals, etc.).

The one or more communication connection(s) 1810 can include physical and/or logical interfaces for connecting the vehicle computing device(s) 1804 to another computing device or one or more external networks (e.g., the Internet). For example, the one or more communication connection(s) 1810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 1802 can include one or more drive module(s) 1814. In some examples, the vehicle 1802 can have a single drive module 1814. In at least one example, if the vehicle 1802 has multiple drive modules 1814, individual drive module(s) 1814 can be positioned on opposite ends of the vehicle 1802 (e.g., the front and the rear, etc.). In at least one example, the drive module(s) 1814 can include one or more sensor system(s) 1806 to detect conditions of the drive module(s) 1814 and/or the surroundings of the vehicle 1802. By way of example and not limitation, the sensor system(s) 1806 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive module(s) 1814. In some cases, the sensor system(s) 1806 on the drive module(s) 1814 can overlap or supplement corresponding systems of the vehicle 1802 (e.g., sensor system(s) 1806).

The drive module(s) 1814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 1814 can include a drive system controller which can receive and preprocess data from the sensor system(s) 1806 and to control operation of the various vehicle systems. In some examples, the drive system controller can include one or more processor(s) and memory communicatively coupled with the one or more processor(s). The memory can store one or more components to perform various functionalities of the drive module(s) 1814. Furthermore, the drive module(s) 1814 also include one or more communication connection(s) that enable communication by the respective drive system with one or more other local or remote computing device(s).

The vehicle computing device(s) 1804 can include one or more processor(s) 1816 and memory 1818 communicatively coupled with the one or more processor(s) 1816. In the illustrated example, the memory 1818 of the vehicle computing device(s) 1804 stores a localization component 1820, a perception component 1822, a prediction component 1824, a planning component 1826, one or more system controller(s) 1828, and one or more(s) 1830. Though depicted as residing in the memory 1818 for illustrative purposes, it is contemplated that the localization component 1820, the perception component 1822, the prediction component 1824, the planning component 1826, the one or more system controller(s) 1828, and the one or more(s) 1830 may additionally, or alternatively, be accessible to the vehicle 1802 (e.g., stored on, or otherwise accessible by, memory remote from the vehicle 1802).

In at least one example, the localization component 1820 may include functionality to receive data from the sensor system(s) 1806 to determine a position and/or orientation of the vehicle 1802 (e.g., one or more of an x-, y-, z-position, roll, pitch, or yaw). For example, the localization component 1820 may include and/or request/receive a map of an environment, such as from map(s) 1830 and/or a remote map component, and may continuously determine a location and/or orientation of the autonomous vehicle within the map. In some instances, the localization component 1820 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 1820 may provide data to various components of the vehicle 1802 to determine an initial position of an autonomous vehicle for determining the relevance of an object to the vehicle 1802, as discussed herein.

In some instances, the perception component 1822 may include functionality to perform object detection, segmentation, and/or classification. In some examples, the perception component 1822 may provide processed sensor data that indicates a presence of an object (e.g., entity) that is proximate to the vehicle 1802 and/or a classification of the object as an object type (e.g., car, pedestrian, cyclist, animal, building, tree, road surface, curb, sidewalk, unknown, etc.). In some examples, the perception component 1822 may provide processed sensor data that indicates a presence of a stationary entity that is proximate to the vehicle 1802 and/or a classification of the stationary entity as a type (e.g., building, tree, road surface, curb, sidewalk, unknown, etc.). In additional or alternative examples, the perception component 1822 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 1824 can generate one or more probability maps representing prediction probabilities of possible locations of one or more objects in an environment. For example, the prediction component 1824 can generate one or more probability maps for vehicles, pedestrians, animals, and the like within a threshold distance from the vehicle 1802. In some instances, the prediction component 1824 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 1824 may generate predicted trajectories of objects (e.g., objects) in an environment and/or to generate predicted candidate trajectories for the vehicle 1802. For example, the prediction component 1824 may generate one or more predicted trajectories for objects within a threshold distance from the vehicle 1802. In some examples, the prediction component 1824 may measure a trace of an object and generate a trajectory for the object based on observed and predicted behavior.

In general, the planning component 1826 may determine a path for the vehicle 1802 to follow to traverse through an environment. For example, the planning component 1826 may determine various routes and trajectories and various levels of detail. For example, the planning component 1826 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 1826 may generate an instruction for guiding the autonomous vehicle along at least a portion of the route from the first location to the second location. In at least one example, the planning component 1826 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 1826 can select a trajectory for the vehicle 1802 based at least in part on receiving data from the sensor system(s) 1806.

In other examples, the planning component 1826 can alternatively, or additionally, use data from the localization component 1820, the perception component 1822, and/or the prediction component 1824 to determine a path for the vehicle 1802 to follow to traverse through an environment. For example, the planning component 1826 can receive data from the localization component 1820, the perception component 1822, and/or the prediction component 1824 regarding objects associated with an environment. Using this data, the planning component 1826 can determine a route to travel from a first location (e.g., a current location) to a second location (e.g., a target location) to avoid objects in an environment. In at least some examples, such a planning component 1826 may determine there is no such collision free path and, in turn, provide a path which brings vehicle 1802 to a safe stop avoiding all collisions and/or otherwise mitigating damage. Additionally, or alternatively, the planning component 1826 can determine the path for the vehicle 1802 to follow based at least in part on data received from the perception component 1822, such as data captured by the sensor system(s) 1806.

In at least one example, the vehicle computing device(s) 1804 may include one or more system controller(s) 1828, which may be configured to control steering, propulsion, braking, safety, emitters, communication, and other systems of the vehicle 1802. The system controller(s) 1828 may communicate with and/or control corresponding systems of the drive module(s) 181814 and/or other components of the vehicle 1802.

The memory 1818 may further include one or more map(s) 1830 that may be used by the vehicle 1802 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1802 may be controlled based at least in part on the map(s) 1830. That is, the map(s) 1830 may be used in connection with the localization component 1820, the perception component 1822, the prediction component 1824, and/or the planning component 1826 to determine a location of the vehicle 1802, detect objects in an environment, generate routes, determine actions and/or trajectories to navigate within an environment.

In some instances, the vehicle 1802 can include a cleaning mechanism 1848 including wiper(s) 1832, actuator(s) 1834, rail(s) 1836, and/or carriage(s) 1838. The cleaning mechanism 1848 may be similar to the cleaning mechanism 110 and/or the cleaning mechanism 1700 as discussed above and clean sensor windows disposed around the sensor system(s) 1806 (e.g., housed within sensor assemblies). The cleaning mechanism 181848 may be controlled via the vehicle computing device(s) 181804 to actuate the actuator(s) 1834, for example, to cause the carriage(s) 1838 to translate within the rail(s) 1836 for cleaning the sensor windows. The actuator(s) 1834 may be independently actuatable via the vehicle computing device(s) 1804.

In some examples, the vehicle 1802 may send sensor data to computing device(s) 1840 via network(s) 1842. In at least one example, the localization component 1820, the perception component 1822, the planning component 1826, and/or the prediction component 1824 may process sensor data, as described above, and may send their respective outputs, over the one or more network(s) 1842, to one or more computing device(s) 1840. In at least one example, the localization component 1820, the perception component 1822, the planning component 1826, and/or the prediction component 1824 may send their respective outputs to the one or more computing device(s) 1840 at a particular frequency, after a lapse of a predetermined period of time, in near real-time, etc.

The processor(s) 1816 of the vehicle 1802 and/or processor(s) 1844 of the computing device(s) 1840 may include any suitable processor capable of executing instructions to process data and perform operations as described herein. By way of example and not limitation, the processor(s) 1816, 1844 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 11818 and 1846 are examples of non-transitory computer-readable media. The memory 1818 and 1846 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 18 is illustrated as a distributed system, in alternative examples, components of the vehicle 1802 may be associated with the computing device(s) 1840, and/or components of the computing device(s) 1840 may be associated with the vehicle 1802. That is, the vehicle 1802 may perform one or more of the functions associated with the computing device(s) 1840 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example system 1800 shown in FIG. 18 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 1800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the system 1800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the system 1800 may be transmitted to the system 1800 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

Figure 19:
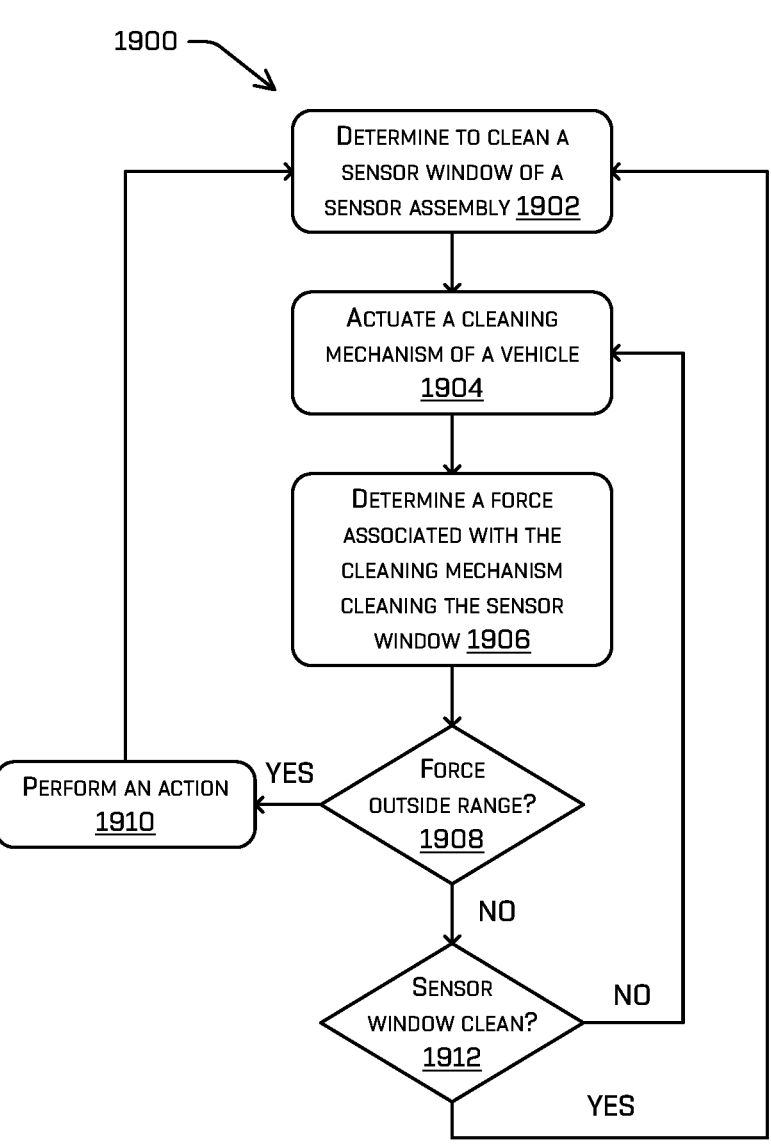
FIG. 19 illustrates an example process for cleaning a sensor assembly, according to examples of the present disclosure.

FIG. 19 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

More specifically, FIG. 19 is a flow diagram of an example process 1900 for cleaning a sensor window of a sensor assembly using a cleaning mechanism. At an operation 1902, the process 1900 includes determining to clean a sensor window of a sensor assembly. For example, in some instances, determining to clean the sensor window may be based at least in part on receiving an indication that the sensor(s) of the sensor assembly requires cleaning, receiving an indication that a threshold time has elapsed since a previous cleaning of the sensor assembly, receiving a weather forecast indicating a weather event (e.g., rain) or lack of a weather event, receiving an indication that a nozzle has ceased spraying pressurized fluid onto the sensor window, receiving an indication that a liquid is on the sensor window, and so forth.

At an operation 1904, the process 1900 includes actuating a cleaning mechanism of a vehicle. For example, the actuator of the cleaning mechanism may actuate to cause a carriage to translate along/within a rail. In turn, a wiper coupled to the carriage may translate over the sensor window for cleaning the sensor window. Actuating the cleaning mechanism may also involve spraying a cleaning fluid such as compressed air, water, detergent, deicer, alcohol, or other liquid agent. In examples, the sensor assemblies may have multiple sprayers that direct the spraying fluid at the sensor windows.

At an operation 1906, the process 1900 may include determining a force associated with the cleaning mechanism cleaning the sensor window. In some instances, the force is an amount of force required by the actuator(s) to translate the carriage along the rail (e.g., an amount of resistance thereto). At 1908, the process 1900 may include comparing the force to a threshold range, to determine whether the force is outside the threshold range. In some instances, boundaries of the threshold range may be associated with a properly functioning wiper. For example, if the force is greater than an upper limit of the threshold range, the wiper may be too constricting on the sensor window and/or an obstruction (e.g., debris, dirt, ice, etc.) may be preventing the wiper translating over the sensor window. Comparatively, if the force is less than a lower limit of the threshold range, the wiper may be too loose on the sensor window. For example, the wiper may be worn and/or damaged. A sensor may couple to the actuator(s) to indicate the amount of force required to actuate the actuator(s).

If at the operation 1908, the process 1900 determines that the force is outside the range, the process 1900 may follow the "YES" route and proceed to an operation 1910. At the operation 1910, the process 1900 may determine to perform an action. The action, when performed attempts to either decrease or increase the amount of force such that the force is within the threshold range. In some instances, the action may be an indication to replace the wiper (e.g., if the force is less than the threshold range). In other instances, the action may be an indication clean the sensor window again, to spray fluid onto the sensor window to reduce friction, to let fluid soak on the sensor window before actuating the actuator(s), etc. From 1910, the process 1900 may loop to the operation 1902.

Alternatively, if at the operation 1908, the process 1900 determines that the force is not o outside (e.g., within) the range, the process 1900 may follow the "NO" route and proceed to an operation 1912. At the operation 1912, the process 1900 may include determining whether the sensor window is clean. Whether the sensor window is clean may be based on data captured by the sensor(s) being blurry, pixelated, and so forth. For example, the data captured by the sensor(s) may include blemishes, and the sensor window may require additional cleaning. If at the operation 1912, the process 1900 determines that the sensor window is not clean, the process 1900 may follow the "NO" route and proceed to the operation 1904. Alternatively, if the process 1900 determines that the sensor window is clean, the process 1900 may follow the "YES" route and proceed to the operation 1902.

Although the process 1900 is described as actuating a single cleaning mechanism of a vehicle, cleaning mechanisms may be actuated, whether collectively or independent, for cleaning mechanisms of a vehicle to clean respective sensor windows. In such instances, the cleaning mechanism (or the sensor windows) may not clean at the same rate. For example, depending on which end of the car is a leading end, bugs, weather, and so forth may not accumulate on the sensor assemblies equally. In this way, the cleaning mechanisms may adapt to a direction of travel for the vehicle, a wind speed, a direction of the rain, etc.

Example Clauses

The following paragraphs describe various examples. Any of the examples in this section may be used with any other of the examples in this section and/or any of the other examples or embodiments described herein.

A: A vehicle, comprising: a sensor assembly including: a circular sensor window, and a sensor residing within the circular sensor window, the sensor having a field of view (FoV) including a first portion directed towards the vehicle and a second portion directed away from the vehicle for sensing an environment of the vehicle; and a cleaning mechanism including: a rail coupled to the sensor assembly at a location inside of the first portion of the FoV, a carriage operably coupled to the rail, an actuator coupled to the carriage, and a circular-shaped wiper coupled to the carriage, the circular-shaped wiper encircling the circular sensor window.

B: The vehicle as recited in paragraph A, wherein the circular-shaped wiper includes: a rigid ring portion; and a rubber portion overmolded around the rigid ring portion, the rubber portion engaging with the circular sensor window.

C: The vehicle as recited in paragraphs A or B, wherein: the circular sensor window includes a top and a bottom; a zone of the circular sensor window resides between the top and the bottom, outside of the FoV; and the circular-shaped wiper has a resting position that is within the zone.

D: The vehicle as recited in any of paragraphs A-C, wherein: the rail includes a channel that has a first track and a second track; the carriage includes a first wheel and a second wheel that engage with the first track and the second track, within the channel; and the actuator is at least partially disposed within the channel.

E: The vehicle as recited in any of paragraphs A-D, further comprising one or more nozzles coupled to the circular-shaped wiper, the one or more nozzles being configured to apply a fluid to the circular sensor window.

F: A sensor assembly, comprising: a circular sensor window; a sensor residing at least one of beneath or within the circular sensor window; and a cleaning mechanism including: a circular wiper that operably engages within the circular sensor window, and an actuator operably coupled to the circular wiper, the actuator being configured to translate the circular wiper over the circular sensor window.

G: The sensor assembly of paragraph F, wherein: the sensor has a field of view (FoV); the actuator is configured to move the circular wiper between a first position and a second position; in the first position, the actuator and the circular wiper reside outside the FoV; and in the second position, at least one of the actuator or the circular wiper reside inside the FoV.

H: The sensor assembly of paragraph F or G, wherein the FoV is 360 degrees.

I: The sensor assembly of any of paragraphs F-H, wherein: the sensor includes a field of view (FoV) having a first portion that is usable to sense an environment and a second portion that is unusable to sense the environment; and the actuator is at least partially disposed within the second portion of the FoV.

J: The sensor assembly of any of paragraphs F-I, wherein the circular wiper includes: a rigid ring portion; and a rubber portion overmolded around the rigid ring portion, the rubber portion operably engaging with the circular sensor window.

K: The sensor assembly of any of paragraphs F-J, further comprising: a carriage coupled to the circular wiper; and a rail along which the carriage translates for translating the circular wiper over the circular sensor window, wherein the actuator is coupled to the carriage, the actuator being configured to impart motion to the carriage such that the carriage translates along the rail.

L: The sensor assembly of any of paragraphs F-K, wherein the rail is disposed along the circular sensor window within a field of view of the sensor.

M: The sensor assembly of any of paragraphs F-L, wherein: the circular sensor window includes a top and a bottom; a zone of the circular sensor window resides between the top and the bottom, outside of a field of view of the sensor; and the circular wiper has a resting position that is within the zone.

N: The sensor assembly of any of paragraphs F-M, further comprising: a second circular sensor window; a second sensor residing at least one of beneath or within the second circular sensor window; and a second cleaning mechanism including: a second circular wiper that operably engages within the second circular sensor window, and a second actuator operably coupled to the second circular wiper, the second actuator being configured to translate the second circular wiper over the second circular sensor window.

O: A method, comprising: determining to clean a circular sensor window; and causing an actuator to actuate such that a circular wiper translates over the circular sensor window.

P: The method of paragraph O, wherein: the circular sensor window houses one or more sensors that have a field of view (FoV) for sensing an environment; the FoV includes a first portion that is usable for sensing the environment and a second portion that is unusable for sensing the environment; and the actuator is disposed inside of the second portion.

Q: The method of paragraph O or P, wherein determining to clean the circular sensor window comprises: receiving sensor data generated by the one or more sensors; and determining, based at least in part on the sensor data, an occlusion within the first portion of the FoV, wherein causing the actuator to actuate is based at least in part on determining the occlusion.

R: The method of any of paragraphs O-Q, wherein the FoV is 360 degrees.

S: The method of any of paragraphs O-R, wherein: the circular sensor window houses one or more sensors that have a field of view (FoV) for sensing an environment; the actuator is configured to move the circular wiper between a first position and a second position during cleaning of the circular sensor window; in the first position, at least one of the actuator or the circular wiper reside outside the FoV; and in the second position, the at least one of the actuator or the circular wiper reside inside the FoV.

T: The method of any of paragraphs O-S, further comprising causing a second actuator to actuate such that a second circular wiper translates over a second circular sensor window.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle, comprising:
a sensor assembly including:
  a circular sensor window, and
  a sensor residing within the circular sensor window, the sensor having a field of view (FoV) including a first portion directed towards the vehicle and a second portion directed away from the vehicle for sensing an environment of the vehicle, the second portion being larger than the first portion; and
  a cleaning mechanism including:
a rail coupled to the sensor assembly at a location inside of the first portion of the FoV, the rail obscuring at least a part of the first portion of the FoV, wherein the rail is stationary during operation of the cleaning mechanism,
a carriage operably coupled to the rail and configured to translate along the rail,
an actuator coupled to the carriage and configured to drive translation of the carriage along the rail, and
a circular-shaped wiper coupled to the carriage, the circular-shaped wiper encircling the circular sensor window.

2. The vehicle of claim 1, wherein the circular-shaped wiper includes:
a rigid ring portion; and
a rubber portion overmolded around the rigid ring portion, the rubber portion engaging with the circular sensor window.

3. The vehicle of claim 1, wherein:
the circular sensor window includes a top and a bottom;
a zone of the circular sensor window resides between the top and the bottom, outside of the FoV; and
the circular-shaped wiper has a resting position that is within the zone.

4. The vehicle of claim 1, wherein:
the rail includes a channel that has a first track and a second track;
the carriage includes a first wheel and a second wheel that engage with the first track and the second track, within the channel; and
the actuator is at least partially disposed within the channel.

5. The vehicle of claim 1, further comprising one or more nozzles coupled to the circular-shaped wiper, the one or more nozzles being configured to apply a fluid to the circular sensor window.

6. A sensor assembly, comprising:
a circular sensor window;
a sensor residing at least one of beneath or within the circular sensor window, the sensor having a field of view (FoV); and
a cleaning mechanism including:
  a wiper that operably engages within the circular sensor window, and
  an actuator operably coupled to the wiper, the actuator being configured to move the wiper between a first position associated with a resting state of the cleaning mechanism and a second position associated with an extended state of the cleaning mechanism, wherein in the first position and the second position, the FoV is at least partially obscured by the cleaning mechanism.

7. The sensor assembly of claim 6, wherein the FoV is 360 degrees.

8. The sensor assembly of claim 6, wherein the FoV has a first portion that is usable to sense an environment and a second portion that is unusable to sense the environment.

9. The sensor assembly of claim 6, wherein the wiper includes:
a rigid ring portion; and
a rubber portion overmolded around the rigid ring portion, the rubber portion operably engaging with the circular sensor window.

10. The sensor assembly of claim 6, wherein:
the cleaning mechanism further comprises:
a carriage coupled to the wiper;
a rail along which the carriage translates for translating the wiper over the circular sensor window; and
the actuator is coupled to the carriage, the actuator being configured to impart motion to the carriage such that the carriage translates along the rail.

11. The sensor assembly of claim 10, wherein the rail is disposed along the circular sensor window within the FoV.

12. The sensor assembly of claim 6, wherein:
the circular sensor window includes a top and a bottom;
a zone of the circular sensor window resides between the top and the bottom, outside of the FoV; and
the wiper has a resting position that is within the zone.

13. The sensor assembly of claim 6, further comprising:
a second circular sensor window;
a second sensor residing at least one of beneath or within the second circular sensor window; and
a second cleaning mechanism including:
  a second wiper that operably engages within the second circular sensor window, and
  a second actuator operably coupled to the second wiper, the second actuator being configured to translate the second wiper over the second circular sensor window.

14. A method, comprising:
determining to clean a circular sensor window, wherein one or more sensors are disposed internal to the circular sensor window;
receiving sensor data generated by the one or more sensors;
causing, based at least in part on the sensor data, an actuator to actuate such that a wiper translates over the circular sensor window;
receiving data associated with a force generated by the actuator to translate the wiper over the circular sensor window;
determining that the force is within a threshold range; and
permitting, based at least in part on the force being within the threshold range, the actuator to actuate the wiper over the circular sensor window.

15. The method of claim 14, wherein:

the one or more sensors that have a field of view (FoV) for sensing an environment;

the FoV includes a first portion that is usable for sensing the environment and a second portion that is unusable for sensing the environment; and the actuator is disposed inside of the second portion.

16. The method of claim 14, further comprising causing a second actuator to actuate such that a second wiper translates over a second circular sensor window.

17. The sensor assembly of claim 6, further comprising a controller configured to:

determine an amount of force associated with the actuator moving the wiper;

determine that the amount of force is outside a threshold range;

determine, based at least in part on the amount of force being outside the threshold range, an action that is associated with causing the amount of force to be within the threshold range; and causing the action to be performed.

18. The method of claim 14, wherein the wiper is configured to translate around at least a portion of a circumference of the circular sensor window.

19. The method of claim 14, wherein the actuator telescopically extends and retracts the wiper over the circular sensor window.

\* \* \* \* \*